(12) United States Patent
Ghazaleh

(10) Patent No.: US 10,803,023 B2
(45) Date of Patent: Oct. 13, 2020

(54) TECHNIQUES FOR READING FROM AND WRITING TO DISTRIBUTED DATA STORES

(71) Applicant: SAS Institute Inc., Cary, NC (US)

(72) Inventor: David Abu Ghazaleh, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 320 days.

(21) Appl. No.: 15/646,885

(22) Filed: Jul. 11, 2017

(65) Prior Publication Data

US 2018/0285263 A1 Oct. 4, 2018

Related U.S. Application Data

(60) Provisional application No. 62/480,497, filed on Apr. 2, 2017, provisional application No. 62/491,517, filed on Apr. 28, 2017.

(51) Int. Cl.
| | |
|---|---|
| *G06F 16/182* | (2019.01) |
| *G06F 12/084* | (2016.01) |
| *G06F 3/06* | (2006.01) |
| *G06F 16/13* | (2019.01) |
| *G06F 16/18* | (2019.01) |
| *H04L 29/08* | (2006.01) |

(Continued)

(52) U.S. Cl.
CPC ............ *G06F 16/182* (2019.01); *G06F 3/064* (2013.01); *G06F 3/067* (2013.01); *G06F 3/0611* (2013.01); *G06F 3/0643* (2013.01); *G06F 3/0659* (2013.01); *G06F 3/0661* (2013.01); *G06F 11/1464* (2013.01); *G06F 12/084* (2013.01); *G06F 16/13* (2019.01); *G06F 16/1858* (2019.01); *H04L 67/06* (2013.01); *H04L 67/1097* (2013.01); *H04L 67/2842* (2013.01); *H04L 67/2847* (2013.01); *G06F 11/1441* (2013.01); *G06F 11/2023* (2013.01); *G06F 11/2041* (2013.01); *G06F 11/2097* (2013.01); *G06F 2212/1024* (2013.01); *G06F 2212/154* (2013.01); *G06F 2212/608* (2013.01)

(58) Field of Classification Search
CPC .................. G06F 12/084; G06F 17/30091
USPC .......................................................... 707/609
See application file for complete search history.

(56) References Cited

U.S. PATENT DOCUMENTS

| | | | |
|---|---|---|---|
| 7,650,331 B1 | 1/2010 | Dean et al. | |
| 7,756,919 B1 * | 7/2010 | Dean ..................... | G06F 9/4881 709/201 |

(Continued)

*Primary Examiner* — Amanda L Willis
*Assistant Examiner* — Griselle C Roland
(74) *Attorney, Agent, or Firm* — Kilpatrick Townsend & Stockton LLP

(57) ABSTRACT

Described herein are techniques for reading data from a distributed storage system and for writing data to a distributed storage system. The disclosed techniques make use of efficient computing task and thread usage to minimize or reduce overhead and improve read or write efficiency. For example, read or write tasks may handle multiple read or write operations instead of just a single operation, which may reduce overhead associated with task creation and termination. Additionally, operations within a single task may be processed in parallel. For example, the disclosed techniques provide MapReduce implementations useful in Apache Hadoop that perform better than previous MapReduce implementations.

30 Claims, 20 Drawing Sheets

(51) Int. Cl.
*G06F 11/14* (2006.01)
*G06F 11/20* (2006.01)

(56) References Cited

U.S. PATENT DOCUMENTS

2008/0301256 A1* 12/2008 McWilliams ....... G06F 12/0284
709/214
2015/0312335 A1* 10/2015 Ying ................... H04L 67/1061
709/201
2016/0092545 A1* 3/2016 Shivarudraiah ....... G06F 16/278
707/600

* cited by examiner

TECHNIQUES FOR READING FROM AND WRITING TO DISTRIBUTED DATA STORES

CROSS-REFERENCE TO RELATED APPLICATIONS

This application claims the benefit of and priority to U.S. Provisional Application No. 62/480,497, filed on Apr. 2, 2017, and U.S. Provisional Application No. 62/491,517, filed on Apr. 28, 2017, which are hereby incorporated by reference in their entireties.

FIELD

This application is in the field of distributed computing and distributed storage. This application relates to improvements in techniques for reading data from and writing data to distributed storage systems.

BACKGROUND

Distributed data storage techniques allow for storing parts of files or databases across multiple servers in a parallel and distributed fashion, such as on a cluster. One implementation of distributed data storage software is the open source Apache Hadoop framework, which makes use of a MapReduce programming model for reading and writing files to the distributed storage or file system.

SUMMARY

Described herein are techniques for reading data from a distributed storage system and for writing data to a distributed storage system. The disclosed techniques make use of efficient computing task and thread usage to minimize or reduce overhead and improve read or write efficiency. For example, read or write tasks may handle multiple read or write operations instead of just a single operation, which may reduce overhead associated with task creation and termination. Additionally, operations within a single task may be processed in parallel. As an example, the disclosed techniques provide MapReduce implementations useful in Apache Hadoop that perform better than previous MapReduce implementations.

In an aspect, systems are described, such as systems for reading data from a distributed storage system or distributed file system. For example, a system of this aspect may comprise one or more processors; and a non-transitory computer readable storage medium in data communication with the one or more processors, such as a non-transitory computer readable storage medium including instructions that, when executed by the one or more processors, cause the one or more processors to perform operations.

As an example, a system may read a file from a distributed file or storage system by performing operations including: obtaining a data block distribution map for a distributed file system, such as a distributed file system that corresponds to a plurality of data blocks distributed across a plurality of nodes, and where the data block distribution map identifies data blocks that are locally stored by each node; receiving a request to read a file from the distributed file system; identifying, using the data block distribution map, multiple data blocks including data responsive to the request and nodes locally storing the multiple data blocks, such as where each of the multiple data blocks corresponds to a portion of the file; assigning each of the multiple data blocks into queues, such as where each queue includes a subset of data blocks from the multiple data blocks, where each queue is associated with a respective node locally storing data blocks of the multiple data blocks, and where each subset of data blocks assigned to a particular queue corresponds to data blocks locally stored by a particular node; instantiating, at each of multiple nodes locally storing data responsive to the request, a plurality of tasks for adding data responsive to the request to a shared cache associated with the request; and processing, in parallel, each plurality of tasks instantiated at the nodes locally storing data responsive to the request. Optionally, the operations further include returning the file as a response to the request, such as response that corresponds to data records added to the shared cache. Optionally, the data block distribution map corresponds to a split distribution map. Optionally, each data block is associated with one or more splits.

In another aspect, methods are described, such as computer implemented methods for reading data from a distributed storage system or distributed file system. As an example, a method of this aspect may comprise obtaining a data block distribution map for a distributed file system, such as a distributed file system that corresponds to a plurality of data blocks distributed across a plurality of nodes, and where the data block distribution map identifies data blocks that are locally stored by each node; receiving a request to read a file from the distributed file system; identifying, using the data block distribution map, multiple data blocks including data responsive to the request and nodes locally storing the multiple data blocks, such as where each of the multiple data blocks corresponds to a portion of the file; assigning each of the multiple data blocks into queues, such as where each queue includes a subset of data blocks from the multiple data blocks, where each queue is associated with a respective node locally storing data blocks of the multiple data blocks, and where each subset of data blocks assigned to a particular queue corresponds to data blocks locally stored by a particular node; instantiating, at each of multiple nodes locally storing data responsive to the request, a plurality of tasks for adding data responsive to the request to a shared cache associated with the request; and processing, in parallel, each plurality of tasks instantiated at the nodes locally storing data responsive to the request. Optionally, a method of this aspect further comprises returning the file as a response to the request, such as a response that corresponds to data records added to the shared cache. Optionally, the data block distribution map corresponds to a split distribution map. Optionally, each data block is associated with one or more splits.

In another aspect, computer-program products are described, such as a computer-program product for reading data from a distributed storage system or distributed file system. As an example, a computer-program product of this aspect may be tangibly embodied in a non-transitory computer readable storage medium comprising instructions configured to, when executed by one or more processors, cause the one or more processors to perform operations including obtaining a data block distribution map for a distributed file system, such as a distributed file system that corresponds to a plurality of data blocks distributed across a plurality of nodes, and where the data block distribution map identifies data blocks that are locally stored by each node; receiving a request to read a file from the distributed file system; identifying, using the data block distribution map, multiple data blocks including data responsive to the request and nodes locally storing the multiple data blocks, such as where each of the multiple data blocks corresponds to a portion of the file; assigning each of the multiple data blocks into queues, such as where each queue includes a subset of data blocks from the multiple data blocks, where each queue is associated with a respective node locally storing data blocks of the multiple data blocks, and where each subset of data blocks assigned to a particular queue corresponds to data blocks locally stored by a particular node; instantiating, at each of multiple nodes locally storing data responsive to the request, a plurality of tasks for adding data responsive to the request to a shared cache associated with the request; and processing, in parallel, each plurality of tasks instantiated at the nodes locally storing data responsive to the request. Optionally, the operations further include returning the file as a response to the request, such as response that corresponds to data records added to the shared cache. Optionally, the data block distribution map corresponds to a split distribution map. Optionally, each data block is associated with one or more splits.

Optionally, processing each task includes: instantiating a plurality of threads for caching data responsive to the request; and processing each of the plurality of threads in parallel. Optionally, processing each thread includes: retrieving an assignment from a queue associated with a particular node on which the thread is processing; obtaining a data record from local storage of the particular node on which the thread is processing, such as a data record that is associated with a data block of the assignment; and adding the data record to the shared cache associated with the request.

Optionally, processing each thread includes repeating, until all data records associated with the data block of the assignment are added to the shared cache: obtaining a next data record from local storage of the particular node on which the thread is processing, such as a next data record that is associated with the data block of the assignment; and adding the next data record to the shared cache associated with the request. In this way, each thread may process all data records associated with a particular data block.

Optionally, processing each thread includes repeating, without terminating the thread until all assignments from the queue associated with the particular node are retrieved: retrieving a next assignment from the queue associated with the particular node on which the thread is processing; obtaining a next data record from local storage of the particular node on which the thread is processing, such as a next data record that is associated with a next data block of the next assignment; and adding the next data record to the shared cache associated with the request. In this way, each thread may obtain additional queue assignments until all data blocks for the file are read or in the process of being read.

Optionally, various aspects associated with reading a file are configurable or may be selected depending on a particular implementation. For example, a maximum number of tasks instantiated at the nodes locally storing data responsive to the request is optionally configurable. As another example, a maximum number of threads instantiated by each task is optionally configurable. Example maximum numbers of threads and tasks may be any integer from 2 to 100 or even greater than 100.

As described above, systems, methods, and computer-program products described herein are useful with distributed file systems corresponding to a Hadoop Distributed File System. For example, each task may optionally correspond to a MapReduce task. Optionally, obtaining a data record from local storage of a particular node on which a thread is processing includes instantiating an HCatalog reader object, calling the HCatalog reader object, and reading the data record from local storage using the HCatalog reader object.

In an aspect, systems are described, such as systems for writing data to a distributed storage system or distributed file system. For example, a system of this aspect may comprise one or more processors; and a non-transitory computer readable storage medium in data communication with the one or more processors, such as a non-transitory computer readable storage medium including instructions that, when executed by the one or more processors, cause the one or more processors to perform operations.

As an example, a system may write a file to a distributed file system by performing operations including: receiving a request to write a file to a distributed file system, such as a distributed file system that corresponds to a plurality of data blocks distributed across a plurality of nodes; partitioning the file into a plurality of file-parts; assigning each of the plurality of file-parts to a queue; instantiating, at each of multiple nodes, a plurality of tasks for completing the request to write the file to the distributed file system; and processing, in parallel, each plurality of tasks. Optionally, the operations further comprise updating a data block distribution map for the distributed file system to indicate which file-parts are locally stored by each node. Optionally, the data block distribution map corresponds to a split distribution map. Optionally, each data block is associated with one or more splits.

In another aspect, methods are described, such as computer implemented methods for writing data to a distributed storage system or distributed file system. As an example, a method of this aspect may comprise receiving a request to write a file to a distributed file system, such as a distributed file system that corresponds to a plurality of data blocks distributed across a plurality of nodes; partitioning the file into a plurality of file-parts; assigning each of the plurality of file-parts to a queue; instantiating, at each of multiple nodes, a plurality of tasks for completing the request to write the file to the distributed file system; and processing, in parallel, each plurality of tasks. Optionally, a method of this aspect further comprises updating a data block distribution map for the distributed file system to indicate which file-parts are locally stored by each node. Optionally, data block distribution map corresponds to a split distribution map. Optionally, each data block is associated with one or more splits.

In another aspect, computer-program products are described, such as a computer-program product for writing data to a distributed storage system or distributed file system. As an example, a computer-program product of this aspect may be tangibly embodied in a non-transitory computer readable storage medium comprising instructions configured to, when executed by one or more processors, cause the one or more processors to perform operations including receiving a request to write a file to a distributed file system, such as a distributed file system that corresponds to a plurality of data blocks distributed across a plurality of nodes; partitioning the file into a plurality of file-parts; assigning each of the plurality of file-parts to a queue; instantiating, at each of multiple nodes, a plurality of tasks for completing the request to write the file to the distributed file system; and processing, in parallel, each plurality of tasks. Optionally, the operations further comprise updating a data block distribution map for the distributed file system to indicate which file-parts are locally stored by each node. Optionally, the data block distribution map corresponds to a split distribution map. Optionally, each data block is associated with one or more splits.

Optionally, processing each task includes: instantiating a plurality of threads for writing file-parts to the distributed file system; and processing each of the plurality of threads in parallel. Optionally, processing each thread includes: retrieving an assignment from the queue, such as an assignment that corresponds to a particular file-part; obtaining a data record from a data buffer associated with the file, such as a data record that corresponds to a portion of the particular file-part; and writing the data record to a data block associated with local storage of a particular node on which the thread is processing.

Optionally, processing each thread includes repeating, until all data records associated with the file-part of the assignment are written to the data block associated with the local storage of the particular node on which the thread is processing: obtaining a next data record from the data buffer associated with the file, such as a next data record that is associated with the file-part of the assignment; and writing the next data record to the data block associated with the local storage of the particular node on which the thread is processing. In this way, each thread may process all data records associated with a particular data block.

Optionally, processing each thread includes repeating, without terminating the thread until all assignments from the queue are retrieved: retrieving a next assignment from the queue; obtaining a next data record from the data buffer associated with the file, wherein the next data record is associated with a next file-part of the next assignment; and writing the next data record to a next data block associated with the local storage of the particular node on which the thread is processing. In this way, each thread may obtain additional assignments from the queue until all data blocks for the file are written or in the process of being written.

Optionally, various aspects associated with reading a file are configurable or may be selected depending on a particular implementation. For example, a maximum number of tasks instantiated at each node is optionally configurable. As another example, a maximum number of threads instantiated by each task is optionally configurable. Example maximum numbers of threads and tasks may be any integer from 2 to 100 or even greater than 100.

As described above, the systems, methods, and computer-program products described herein are useful with distributed file systems corresponding to a Hadoop Distributed File System. For example, each task may optionally correspond to a MapReduce task. Optionally, writing a data record to storage of a distributed file system includes instantiating an HCatalog writer object, calling the HCatalog writer object, and writing the data record to a data block using the HCatalog writer object.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
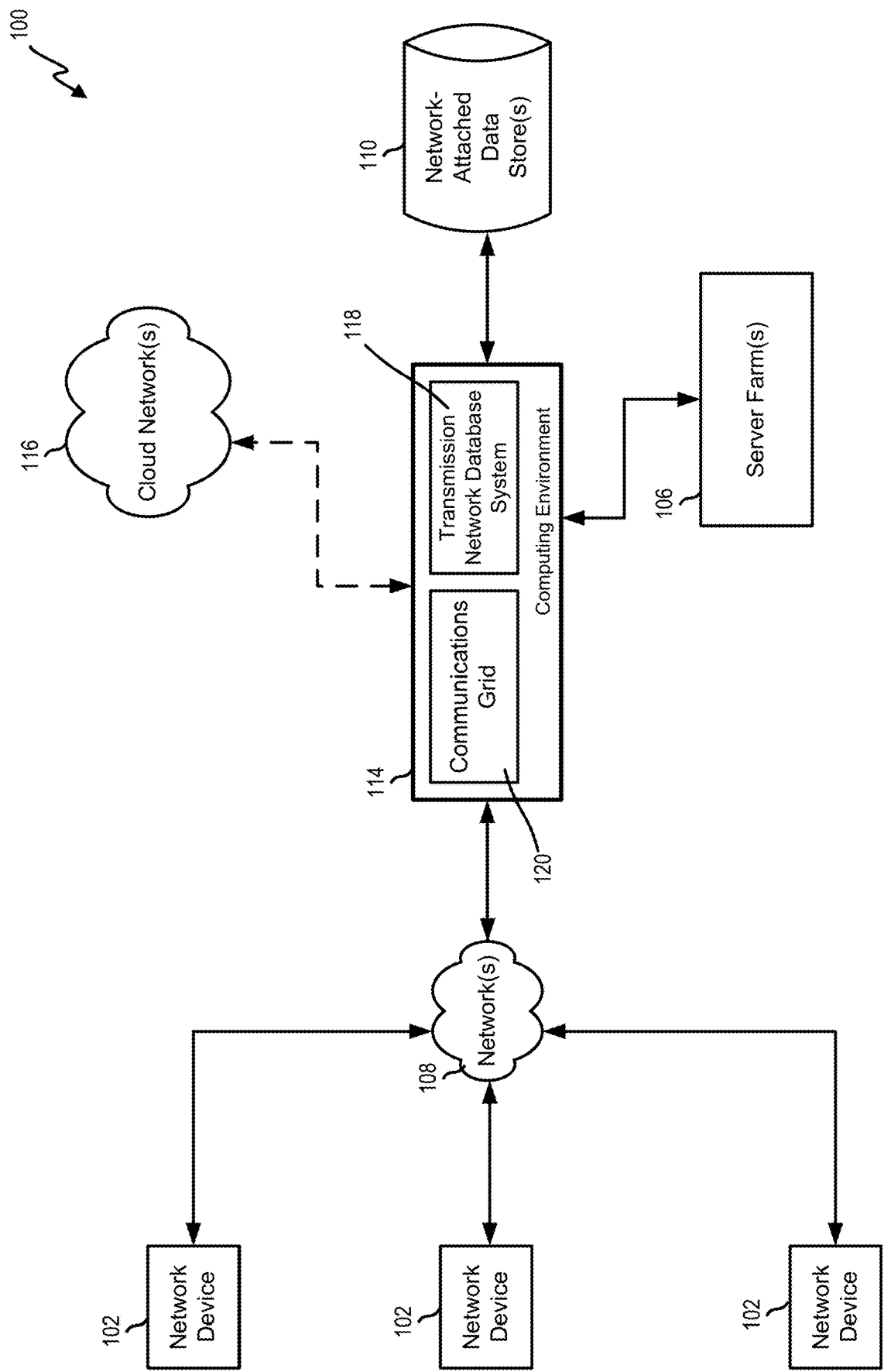
FIG. 1 illustrates a block diagram that provides an illustration of the hardware components of a computing system, according to some embodiments of the present technology.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Distributed data storage systems allow for storing data or files on multiple different servers (i.e., nodes) at the same time. For example, servers in a distributed computing environment or computer cluster may each include a local data storage device, such as a hard disk drive, flash drive, solid-state drive, optical storage medium, magnetic storage medium, or other non-transitory digital storage medium, with different local storage devices storing different parts of a file. It will be appreciated that the terms distributed data storage system, distributed storage system, and distributed file system are used interchangeably herein and refer, for example, to a logical digital data storage system that resides on and/or is distributed across multiple physical data storage devices of multiple different computers, nodes, or servers.

For example, a file may be split into one or more blocks with each block independently stored to local storage on one or more nodes. For example, a file may correspond to any file type of any size, depending on the usage of the distributed file system. In some examples, a file may correspond to a database file, which may be many megabytes, gigabytes, or even terabytes in size. A data block, however, may refer to a single small part of a larger file, and each data block may include individual data records that make up the data block. A data block may correspond to a standard block size used with a particular distributed storage system or architecture. It will be appreciated that the term split may be used, in embodiments, as interchangeable with the term block herein. It will be appreciated, however, that data splits and data blocks may be different since, in general, a split corresponds to a logical partition of data, while a block corresponds to a physical partition of data, and thus multiple splits may be assigned to a single data block or multiple data blocks may be assigned to a single split. Irrespective of the use of data splits or data blocks, the data reading and writing techniques will apply equally to a distributed data storage technique organized according to data splits or data blocks.

An example block size may be 64 MB, though other block sizes may be used, such as 32 MB, 128 MB, 256 MB, 512 MB, etc. A 640 MB file, then, for example, may be split into 10 different 64 MB blocks, and these 10 different blocks may be stored on up to 10 or more nodes. Many examples are possible, such as where all blocks are stored by a single node, where several blocks are stored on several nodes, or where all blocks are split up on 10 different nodes. Data redundancy is also possible, such that each block may be independently stored on one or more nodes and, thus, greater than 10 nodes may store all or portions of the full 640 MB file. It will be appreciated that a data block may be broken down into multiple data records, which may correspond to a standard size, data structure, or set of data structures used with a particular distributed storage system or architecture.

Due to the distribution of data across multiple nodes, use of distributed data storage may provide fast or improved data read and/or write performance, since different nodes may store and retrieve different data elements simultaneously. Use of distributed data storage may also provide for more or improved data redundancy, since multiple nodes may each store duplicative copies of some or all data.

Certain distributed data storage implementations, however, may exhibit inefficiencies in the specific techniques used for reading and writing data elements from or to the storage. For example, some distributed data storage implementations may allow nodes read and write access to storage that is not local to the node, which may require additional processing and network resources to perform the read and write operations. It will be appreciated that, in some embodiments, the techniques described herein make use of a distributed storage implementation in which nodes read and write from or to local storage, such as to minimize, eliminate, or reduce processing and network resources associated with reading and writing from or to non-local storage.

Additionally, some distributed storage implementations may exhibit inefficient processing resource usage by way of overhead. For example, in some distributed storage implementations, virtualized computing environments (e.g., Java Runtime Environment) are used for performing or otherwise achieving a read or write operation or task, such as by way of a mapper task and/or a reducer task, and processing overhead may be associated with instantiating and terminating each virtual task used for read or write operations. It will be appreciated that, in some embodiments, the techniques described herein make use of a distributed storage implementation in which this type of overhead is minimized or reduced as compared to other distributed storage implementations.

The distributed storage techniques and systems described herein advantageously improve data read and write operation speed, reduce processing overhead associated with data read and write operations, and reduce network utilization associated with data read and write operations as compared to previous distributed storage techniques and systems. These improvements may be achieved, at least in part, by nodes performing read and write operations on local storage and by efficient virtual task usage, which may correspond to one or more of reduction of the number of tasks for a particular file or data read or write operation, reduction of task overhead by using fewer numbers of tasks for a particular file or data read or write operation, reduction of task overhead by each task performing multiple read or write processes before the task is terminated, and allowing each task to perform multiple read or write processes in parallel by use of multiple threads within a single task. These techniques may advantageously reduce processing overhead and may result in improved read and write performance, as well as read and write operation scheduling.

It will be appreciated that distributed data storage techniques may make use of one or more tasks to read or write data blocks in response to a request to read a file or write a file. Each task may employ multiple threads for reading or writing the data blocks responsive to a file read or write request in parallel. As used herein, the term task may refer to a computing process, which may be, include, or make use of a virtualized computing process, for performing a particular function. For example, in the context of distributed storage, a task may correspond to a process for reading one or more blocks of data from a storage device or writing one or more blocks of data to a storage device. Tasks may be assigned processing resources according to a schedule, which may be managed by a resource manager.

Advantageously, instead of having each read or write task only read or write a single data block from or to a storage device, techniques described herein optionally allow each read or write task to read or write multiple data blocks from or to a storage device before the task is terminated. This configuration may reduce the number of total tasks and the associated processing overhead since each task can read or write multiple data blocks instead of just one and overhead may be associated with creating and terminating each task. Additionally, since fewer numbers of tasks would be associated with a particular read or write operation, scheduling of the tasks may be improved, resulting in better read or write performance, since there may be fewer tasks waiting for scheduled processing resources.

It will be appreciated, however, that failure of a task that performs multiple data block read or write operations may result in having to repeat all of the multiple data block read or write operations if it is desired to continue processing the read or write task. For the case where each task only performs a single data block read or write operation, failure of the task results in only a single read or write operation having to be repeated. Embodiments of the present techniques, however, may accommodate for failures of a task that performs multiple data block read or write operations by tracking which data blocks have been successfully read or written and re-queuing data blocks needing to be read or written again upon task failure.

Within each task, one or more threads may be operating in parallel, with each thread corresponding to the actual execution of program instructions. A server or node may include two or more physical processors, allowing for parallel (i.e., simultaneous) operation of different threads. Advantageously, tasks used in the techniques described herein may employ multiple threads for performing a particular read or write operation. For example, each thread within a particular task may be associated with reading or writing data from or to a data block. In this way, a single read or write task may perform read or write operations on multiple data blocks in parallel on a single node. This may magnify the efficiency gains described above with regards to each task being able to read or write multiple data blocks instead of just a single data block, since each task may be able to read or write not just multiple data blocks but multiple data blocks in parallel before the task is terminated.

As an example, on a particular node, multiple tasks may be allowed to run simultaneously, such as 6 tasks. Within each task, multiple threads may be allowed to execute simultaneously, such as 3 threads. The number of simultaneous tasks on a particular node may be configurable and may correspond to any integer greater than 2, such as any integer between 2 and 100, for example. Similarly, the number of simultaneous threads in a particular task may be configurable and may correspond to any integer greater than 2, such as any integer between 2 and 100, for example. In some instances, however, only a single task may be assigned to a node. Similarly, in some instances, only a single thread may be assigned to a node.

For efficient operation of a distributed storage system, a data block distribution map, indicating which data blocks are stored locally by which nodes, may be available. A process of writing data to storage may include updating a data block distribution map. In this way, a master task controlling or managing read operations may allocate tasks to a particular node on which the data is stored locally by referencing the data block distribution map.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
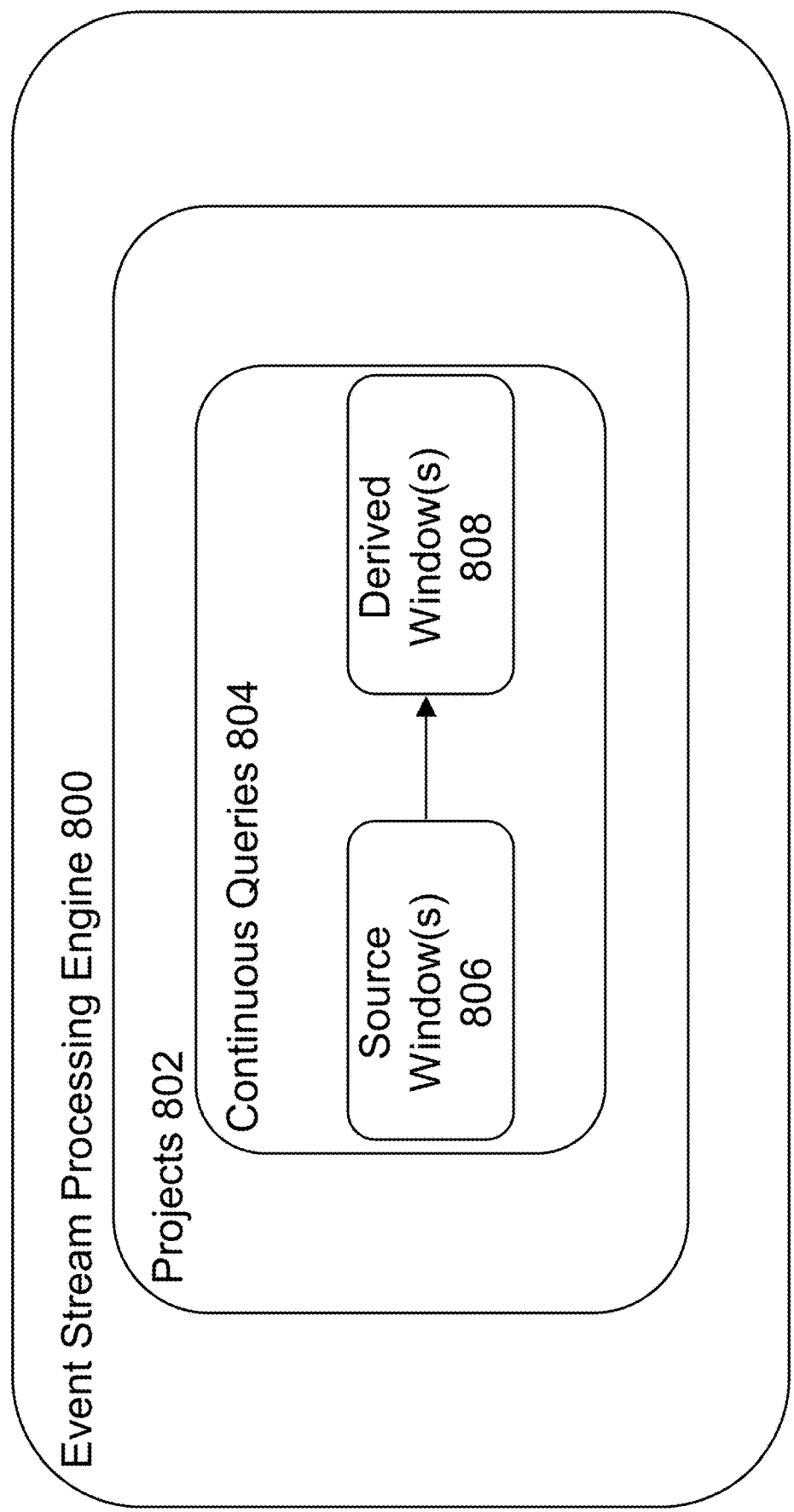
FIG. 8 illustrates a block diagram including components of an Event Stream Processing Engine (ESPE), according to embodiments of the present technology.
Figure 9:
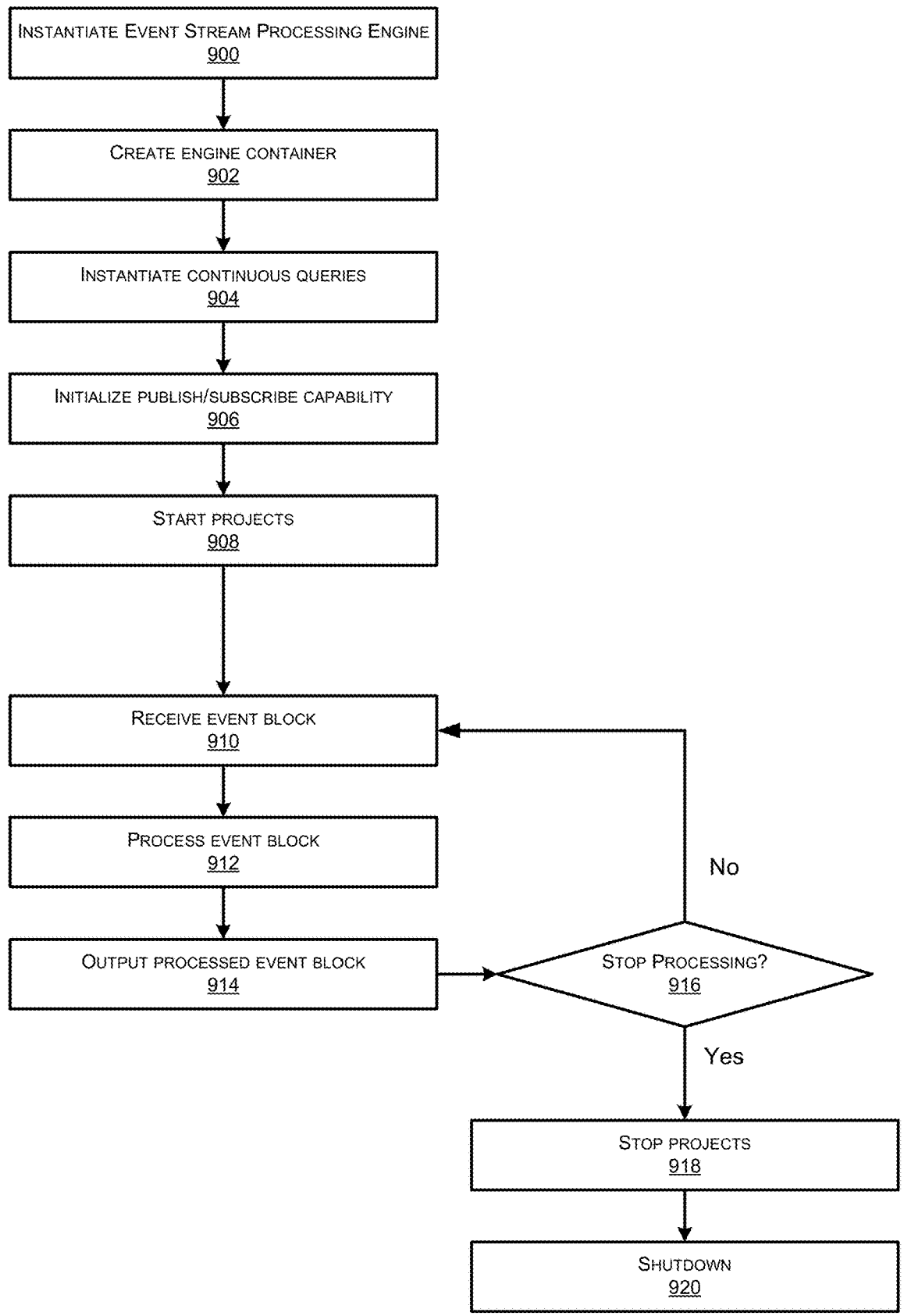
FIG. 9 illustrates a flow chart showing an example process including operations performed by an event stream processing engine, according to some embodiments of the present technology.
Figure 10:
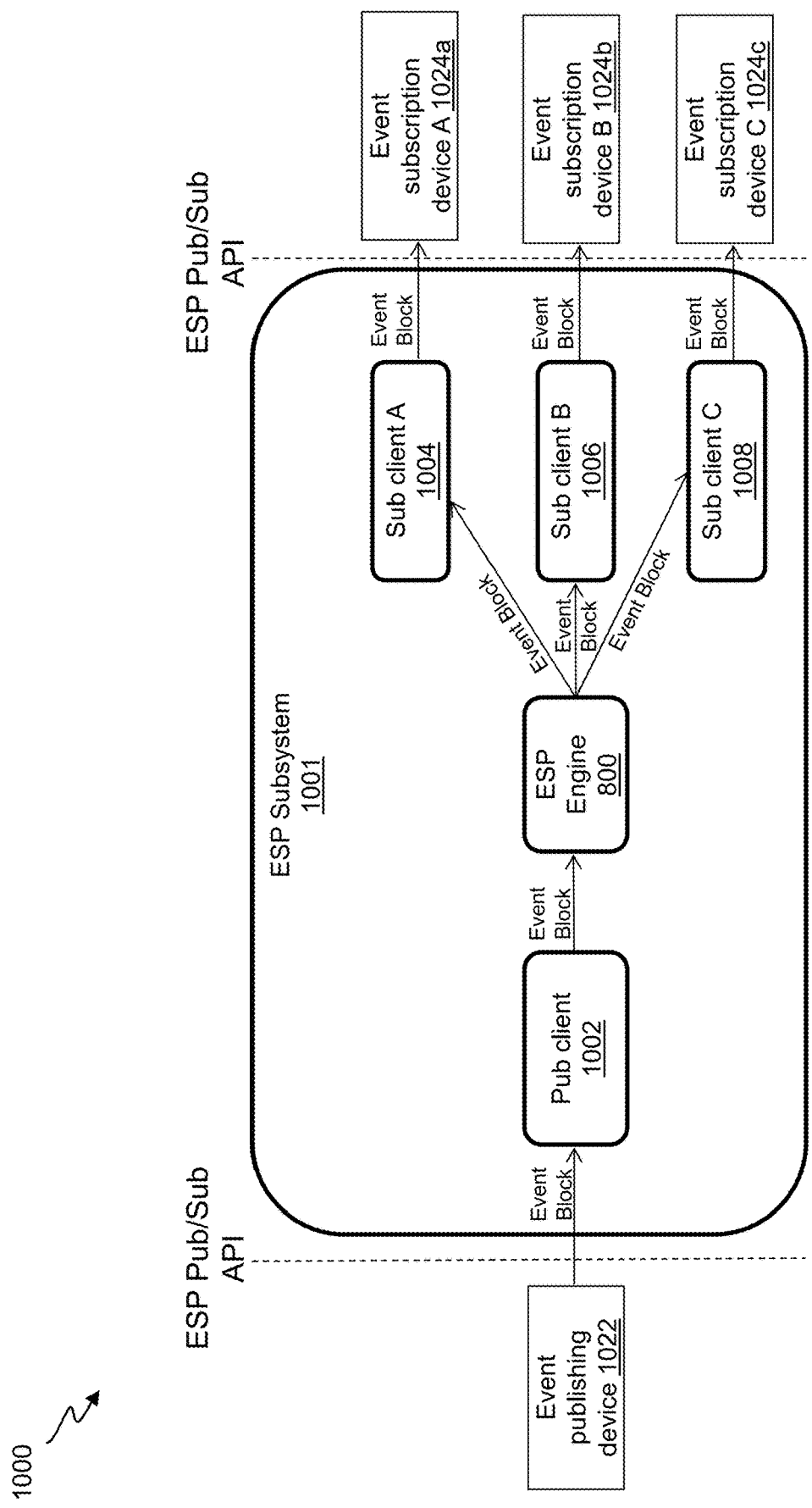
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100. It will be appreciated that network-attached data stores 110 may correspond to a distributed storage system, which in turn may correspond to a distributed storage implementation operating on a computing cluster or server farm.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system. Server farms 106 may correspond to computing clusters or communications grid computing system, for example.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
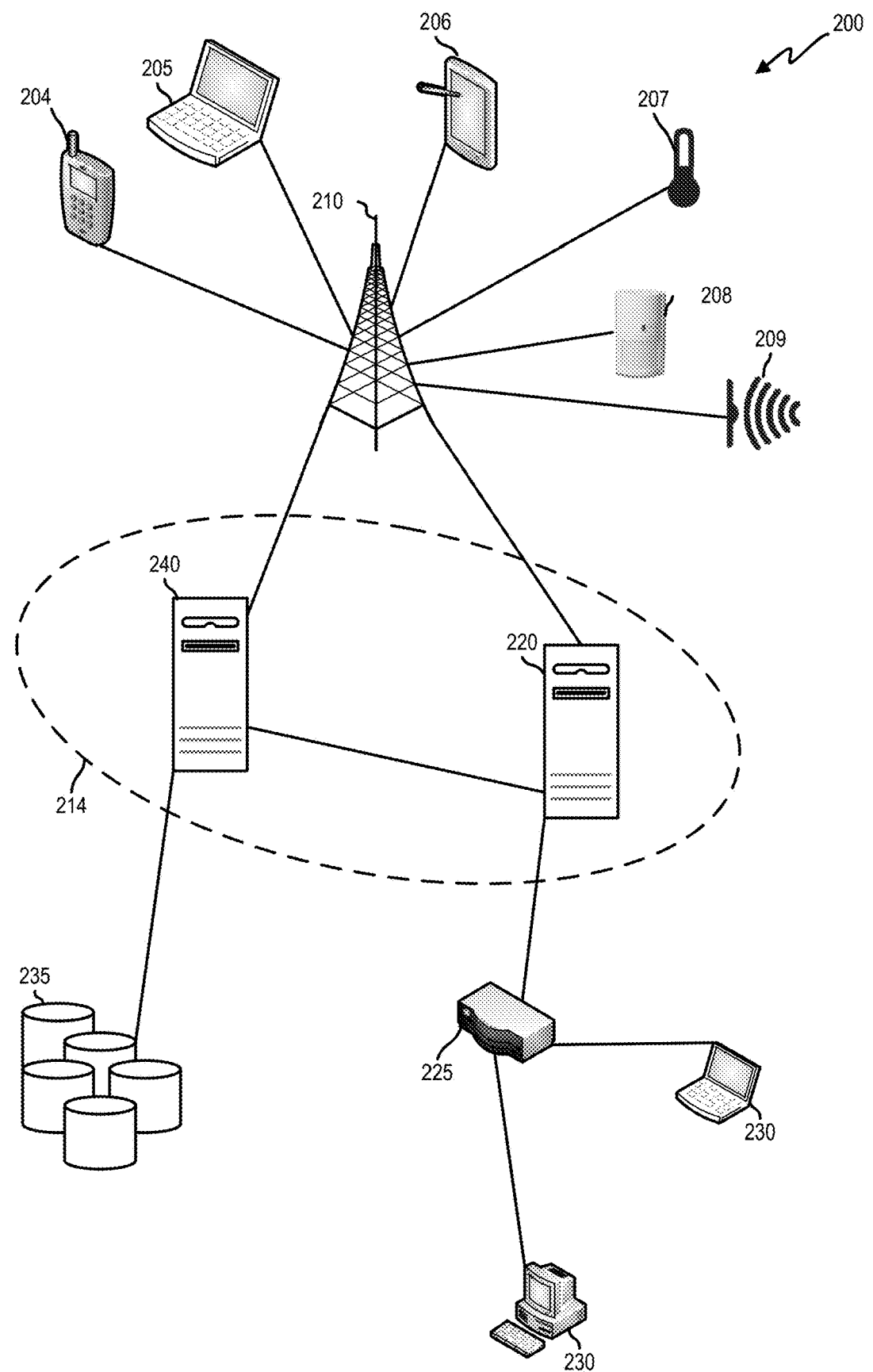
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
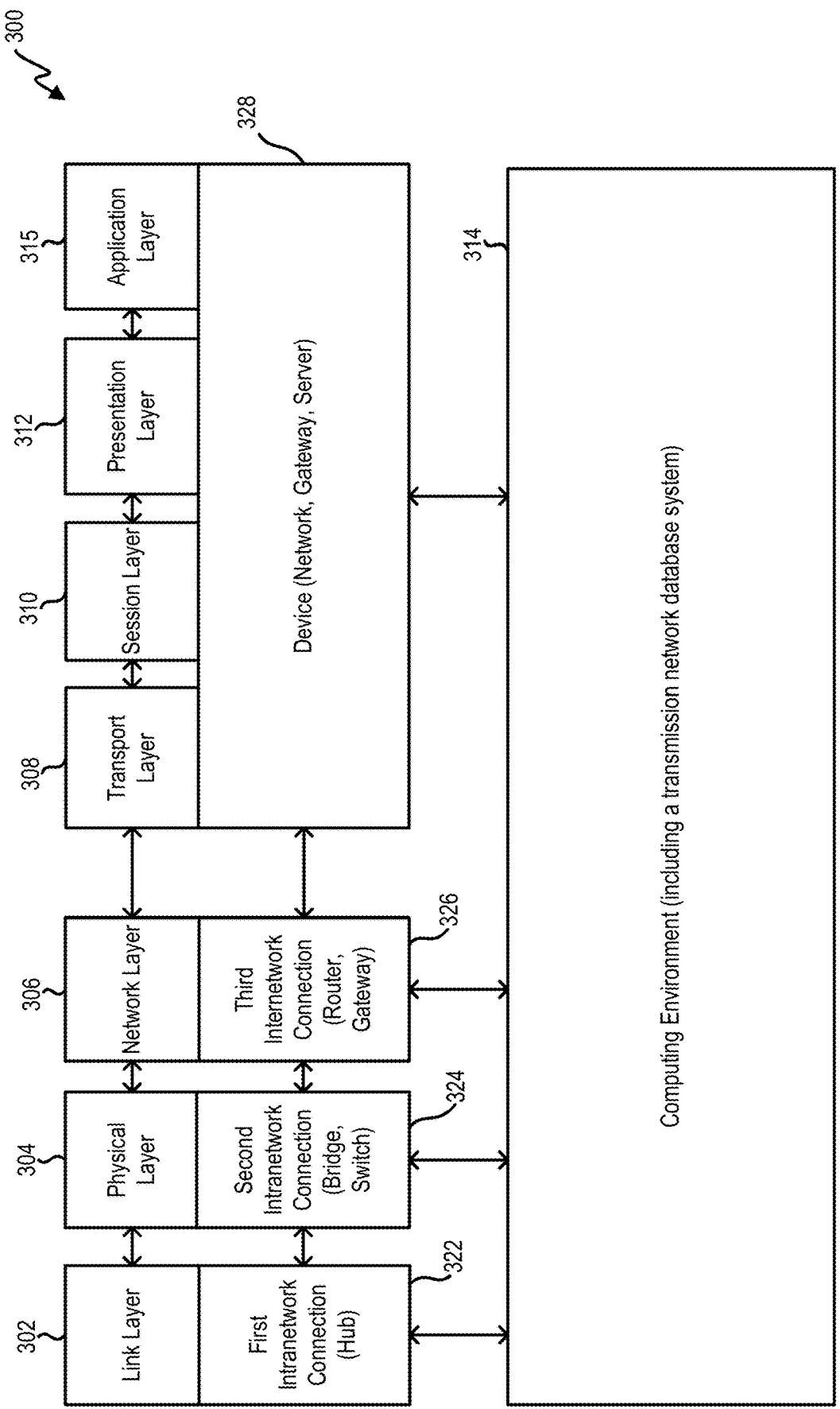
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 315 interacts directly with software applications and end users, and manages communications between them. Application layer 315 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-315. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
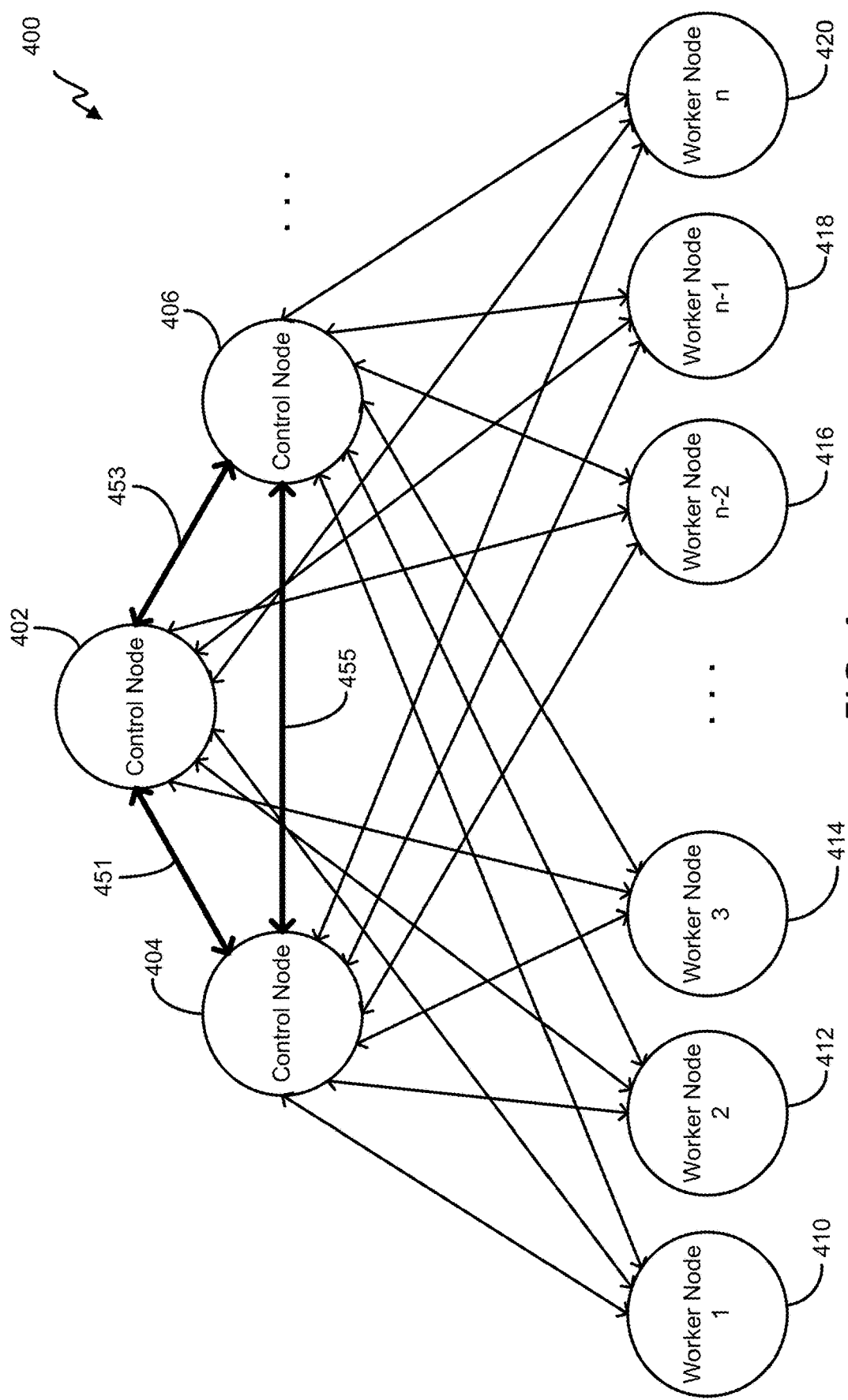
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420.

Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
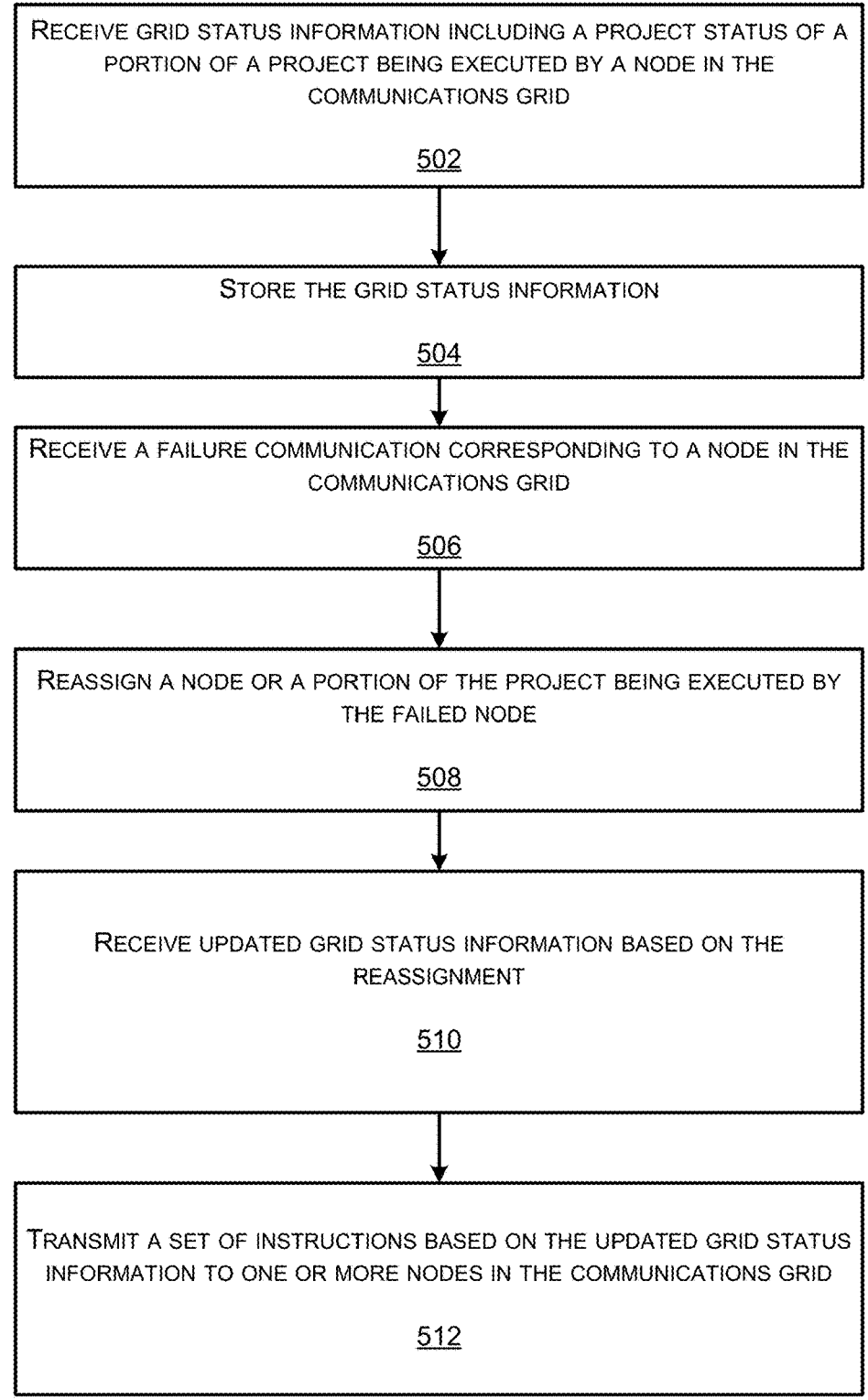
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
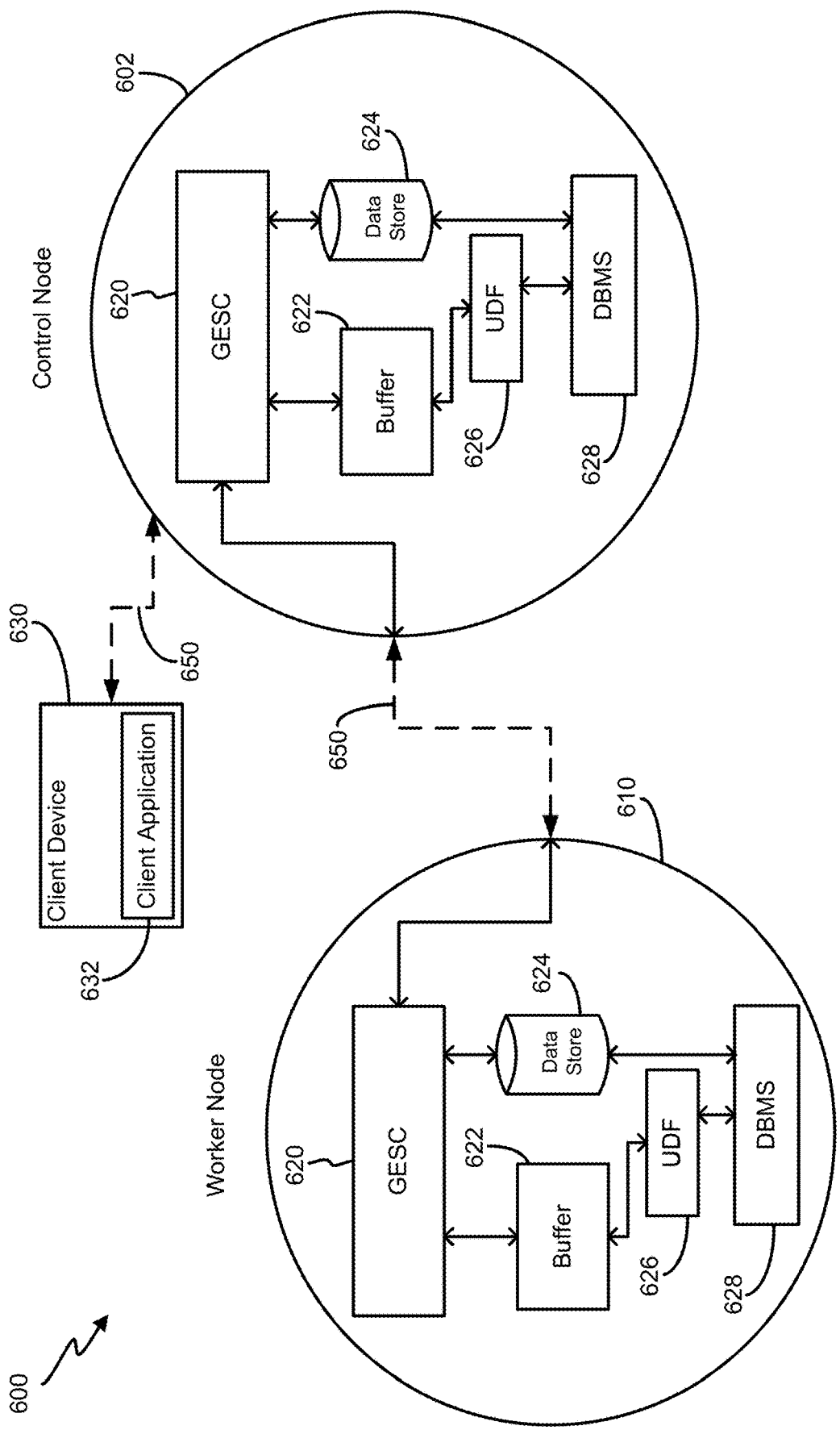
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
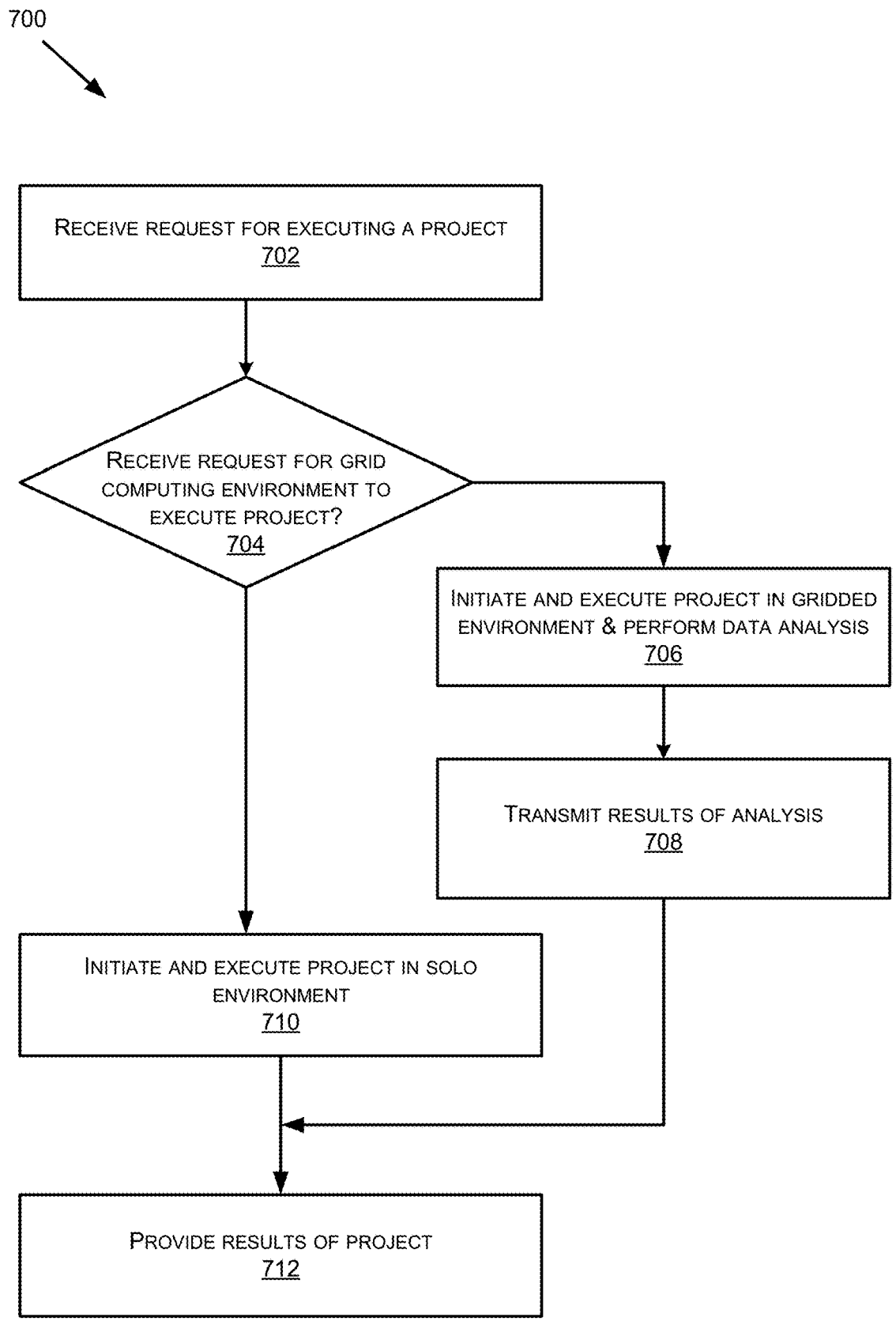
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
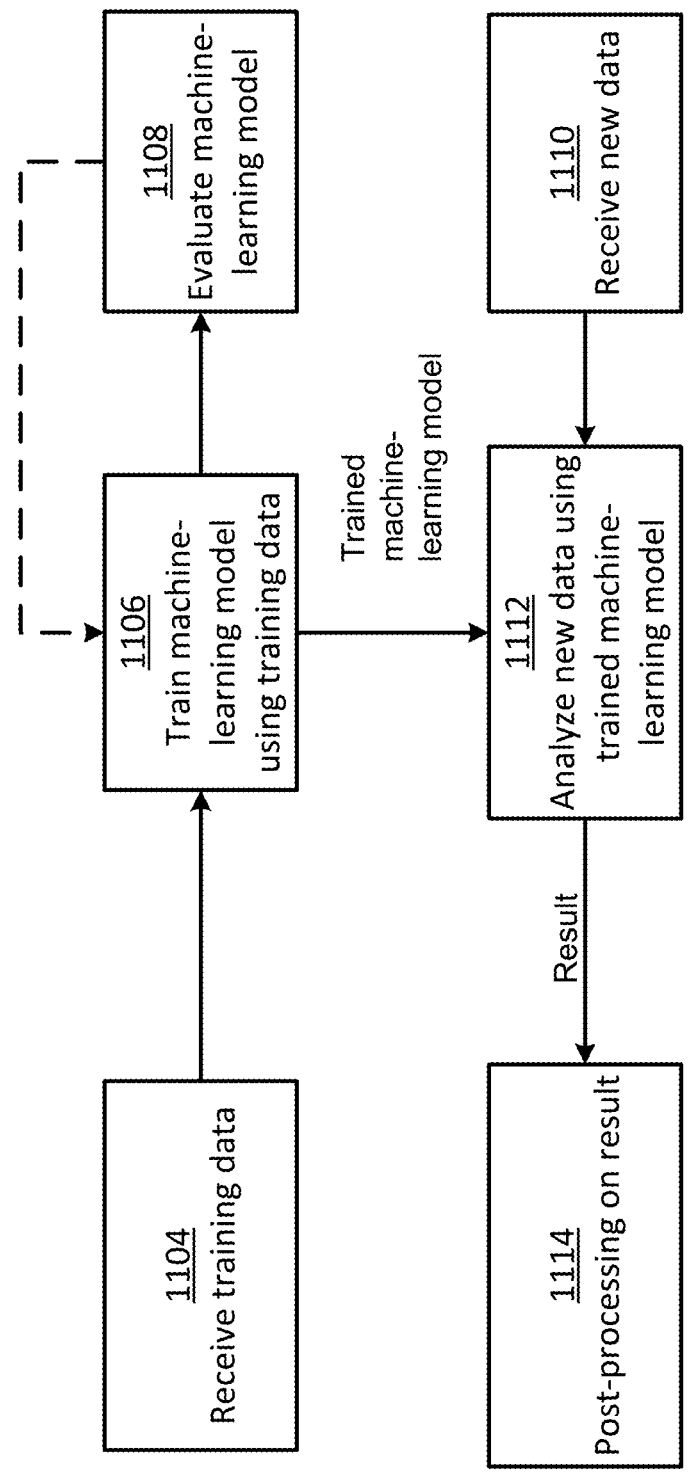
FIG. 11 illustrates a flow chart of an example of a process for generating and using a machine-learning model, according to embodiments of the present technology.

FIG. 11 illustrates a flow chart of an example of a process for generating and using a machine-learning model, according to embodiments of the present technology. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
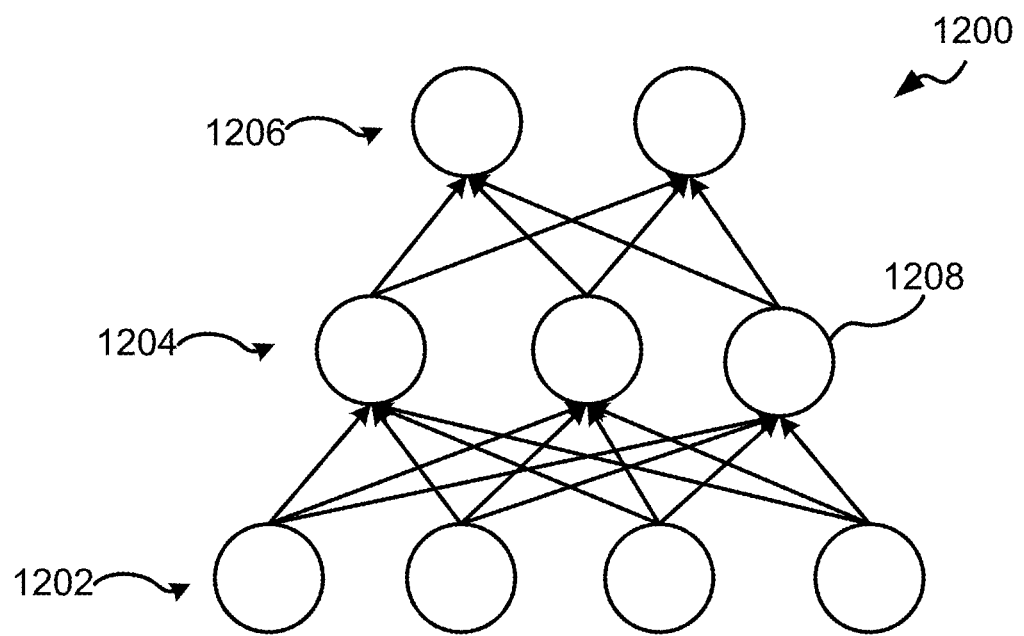
FIG. 12 illustrates a neural network that represents a more specific example of a machine-learning model, according to embodiments of the present technology.

A more specific example of a machine-learning model is the neural network 1200 shown in FIG. 12, according to embodiments of the present technology. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, network resources, or any combination of these consumed by a computing device when analyzing data, reading data, or writing data. For example, a neural network may more readily identify patterns in data than other approaches. This may enable the neural network to analyze the data using fewer processing cycles and less memory than other approaches, while obtaining a similar or greater level of accuracy. As another example, a distributed data storage system may read or write data using fewer processing cycles, less network resources, and less memory than other approaches, while obtaining a similar or greater level of accuracy or performance.

Figure 13A:
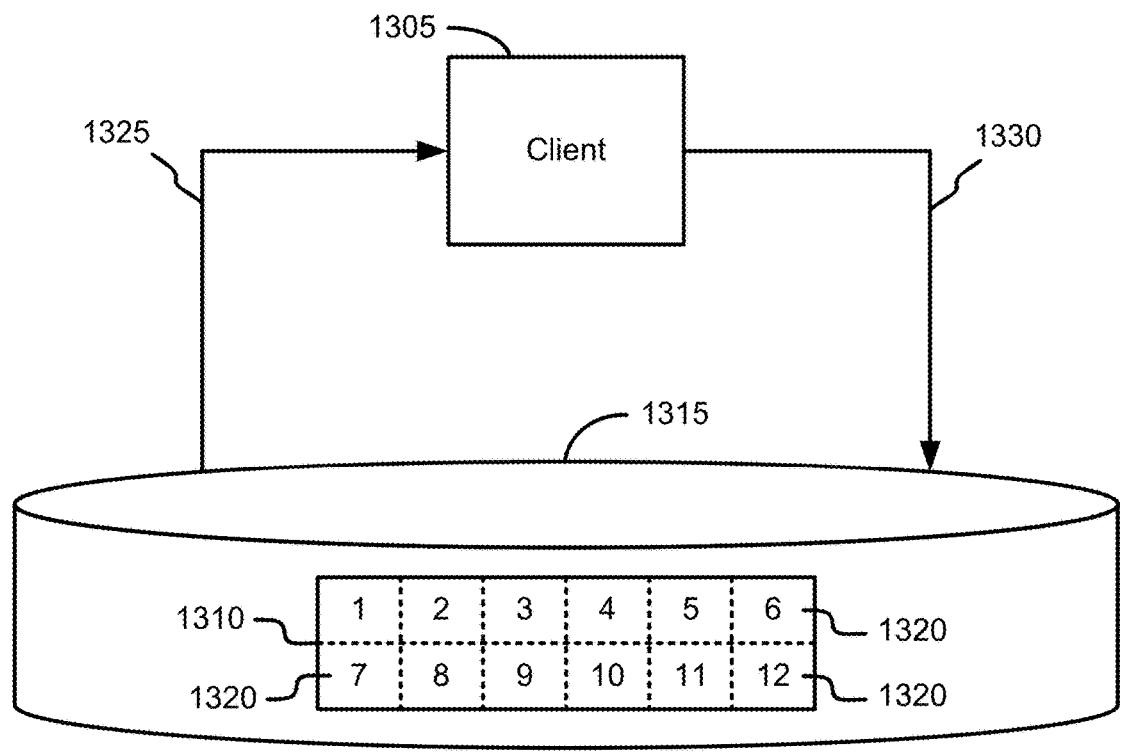
FIG. 13A depicts a client reading or writing a data file from or to a data storage system.
Figure 13B:
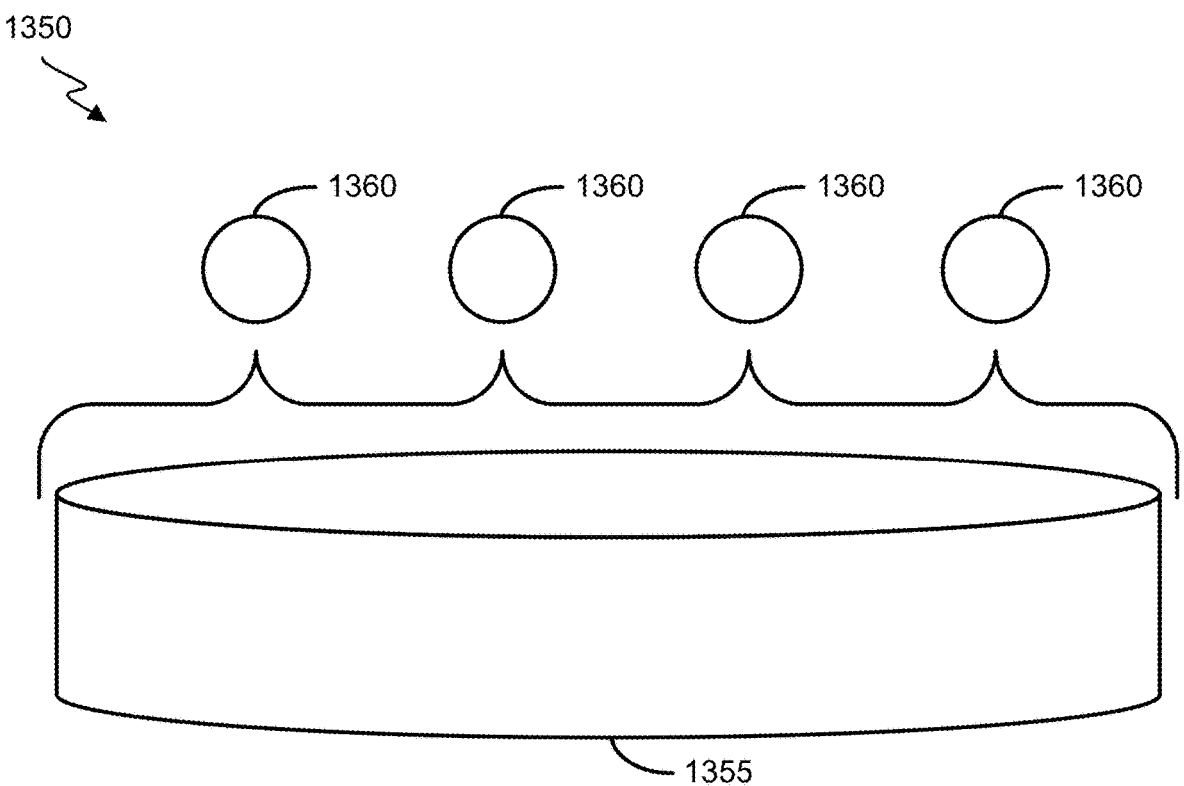
FIG. 13B depicts a data storage system distributed across multiple nodes.

FIG. 13A depicts a client 1305 reading or writing a data file 1310 from or to a data storage system 1315. As illustrated, the data file 1310 is broken into 12 data blocks 1320. In the context of non-distributed data storage techniques, data storage system 1315 may correspond to storage local to the client or to storage system on a network, such that a read operation 1325 may correspond to the process of copying the data file 1310 into working memory of client 1305 or where a write operation 1330 may correspond to the process of copying the data file 1310 from working memory of client 1305 to the data storage system 1315. FIG. 13B illustrates a distributed storage system 1350 in which a data storage system 1355 is provided by multiple nodes 1360, with each node 1360 providing local storage as a portion of data storage system 1355. When the data storage system 1315 of FIG. 13A corresponds to a distributed data storage system, such as distributed storage system 1350 as illustrated in FIG.

13B, it will be appreciated that data blocks 1320 may be stored by one or more nodes 1360. Although the distributed storage techniques described herein depict use of four nodes for illustration purposes, it will be appreciated that more or fewer nodes may be employed in a distributed storage system, including nodes that do not store data responsive to a particular data request.

Figure 14A:
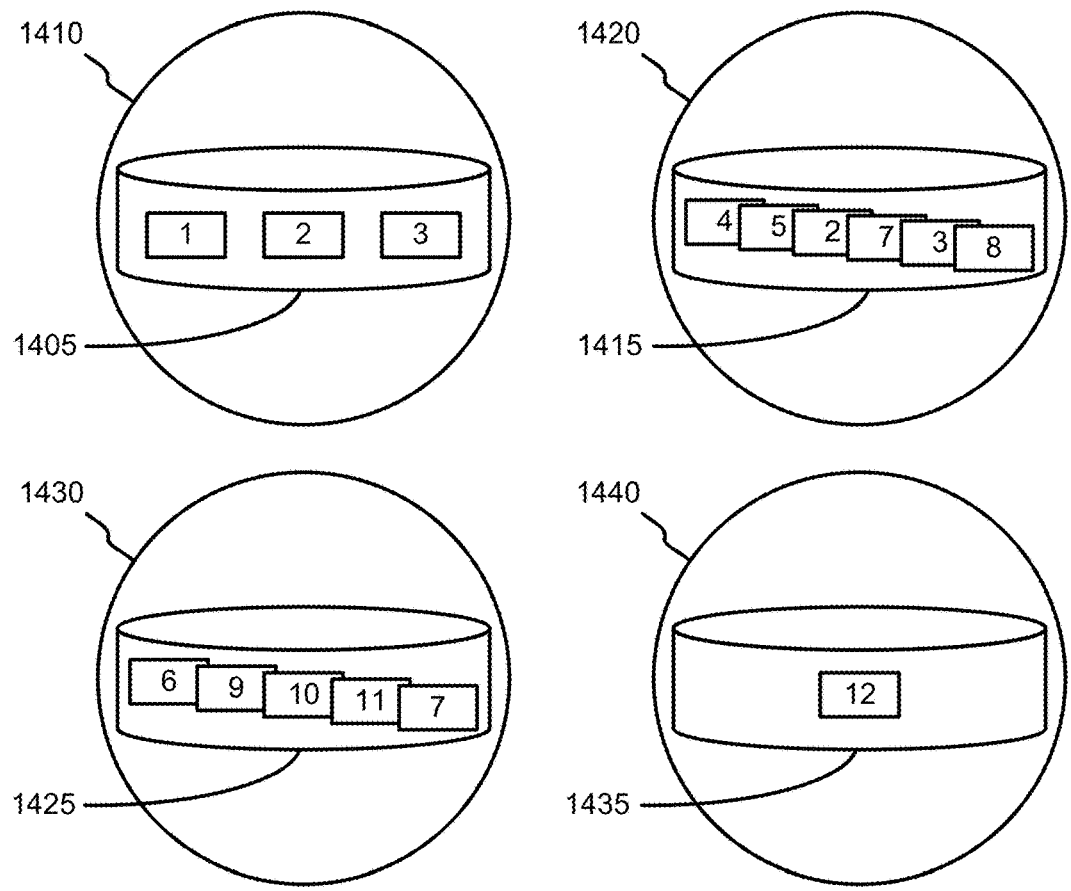
FIG. 14A depicts data nodes with local data storage systems storing different data blocks of a data file in a distributed fashion according to a distributed storage technique.
Figure 14B:
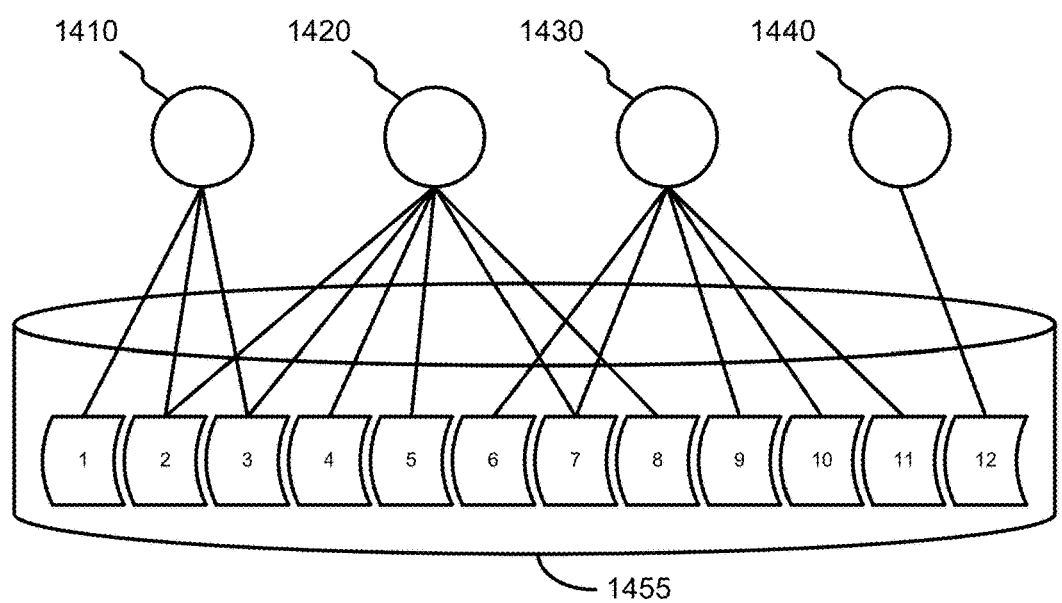
FIG. 14B depicts an alternative view of storage of the data file of FIG. 14A across multiple nodes.

FIG. 14A illustrates the storage of a 12-block data file across four different nodes of a distributed storage system. For example, blocks 1, 2, and 3 of the file may be stored on local storage 1405 of a first node 1410; blocks 2, 4, 5, 7, 3, and 8 of the file may be stored on local storage 1415 of a second node 1420; blocks 6, 9, 10, 11, and 7 of the file may be stored on local storage 1425 of a third node 1430; and block 12 of the file may be stored on local storage 1435 of a fourth node 1440. It will be appreciated that data blocks stored on local storage may be stored sequentially or non-sequentially. It will also be appreciated that data blocks may be reproduced across nodes, such that each data block may be stored in local storage on one or more nodes to provide data redundancy. FIG. 14B illustrates an alternative view of storage of a 12-block data file across four different nodes of a distributed storage system, with the data blocks 1450 stored to distributed storage 1455 organized on nodes 1410, 1420, 1430, and 1440.

Figure 15:
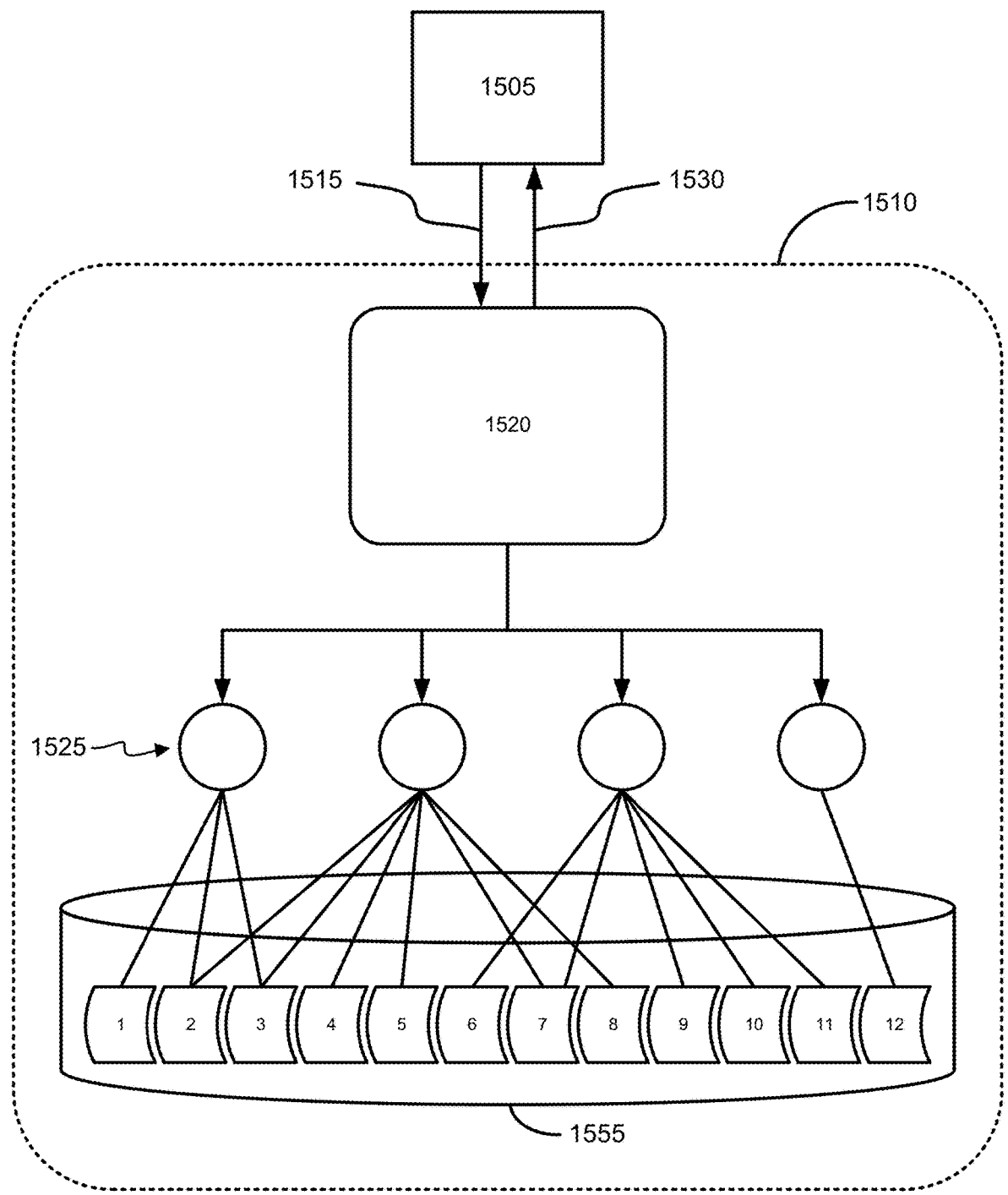
FIG. 15 provides a schematic illustration of a client reading a data file from a distributed storage system, according to some embodiments of the present technology.

FIG. 15 provides a schematic illustration of a client 1505 reading a file from a distributed storage system 1510. Client 1505 may communicate a request 1515 for the file, which may be received at a controller 1520 of the distributed storage system 1510. It will be appreciated that request 1515 may be communicated by way of one or more data or network communication systems. Controller 1520 may correspond to a server or node of or a process or subroutine operating on distributed storage system 1510.

Controller 1520 may determine which data blocks are responsive to the file request 1515 and which nodes store the data blocks, such as by building, retrieving, or otherwise obtaining a data block distribution map. Using the data block distribution map, controller 1520 may determine which data blocks are responsive to file request 1515. It will be appreciated that each data block may correspond to or contain a portion of the file requested in file request 1515. In the context of the data file split into 12 data blocks, controller 1520 may determine which nodes 1525 of distributed storage system 1510 locally store the responsive data blocks and assign a queue of read jobs to the nodes 1525 to obtain the responsive data blocks from distributed storage 1555. The queue of read jobs assigned to nodes 1525 may or may not include redundancies for reading a particular block using multiple nodes. Tasks may be instantiated on each of the nodes to complete the process of reading the data blocks responsive to the file request. Once the data blocks responsive to the file request 1515 are read by nodes 1525, the data file may be communicated 1530 to client 1505.

Figure 16:
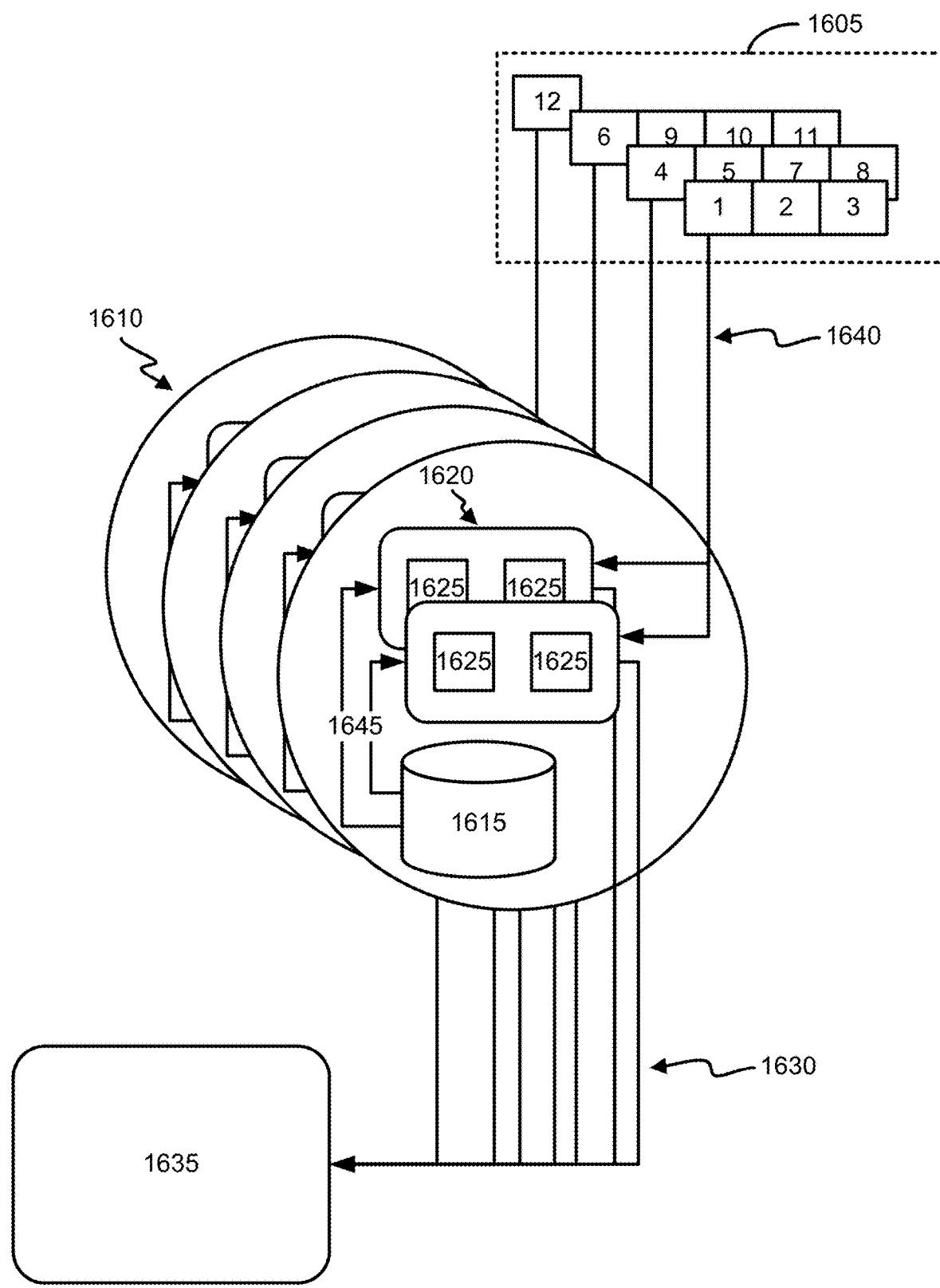
FIG. 16 provides a schematic illustration of a technique for reading a data file from a distributed storage system, according to some embodiments of the present technology.

FIG. 16 provides an schematic overview of reading a data file from a distributed storage system. In FIG. 16, queues 1605 are assigned for nodes 1610 having data responsive to a file read request in local storage 1615, as described above. Multiple tasks 1620 may be instantiated on each node 1610, and each task may instantiate a plurality of threads 1625 for performing the read processes needed to obtain the data blocks responsive to a file request. It will be appreciated that the number of tasks 1620 and the number of threads 1625 may be a configurable option in a distributed storage implementation, but use of multiple tasks 1620 and multiple threads 1625, at least in part, may provide optimizations and enhancements over other distributed storage implementations, as noted above. It will further be appreciated that each task 1620 may process or operate in parallel on each node 1610. Similarly, each thread 1625 may process or operate in parallel within each task 1620.

Processing of instantiated tasks 1620 and threads 1625 may result in adding (1630) data responsive to a file request to a shared cache 1635, which may correspond to a memory, buffer, or other transitory or non-transitory storage location within a distributed storage system. To add the data responsive to the file request to the shared cache 1635, each thread may retrieve (1640) a queue assignment from a queue 1605 associated with the particular node 1610 on which the thread 1620 and/or task 1625 is processing. A queue assignment may correspond, for example, to a particular data block that needs to be read from local storage 1615 on node 1610 to fulfill the file request. Each thread 1620 may then obtain (1645) data record from local storage 1615 for the data block associated with a current assignment and add the data records to the shared cache 1635 and repeat obtaining data records until all data records for a particular data block are obtained. Once all data records associated with a particular data block are obtained and added to the shared cache, thread 1625 may repeat retrieving a queue assignment (if any remain) from the particular queue 1605 assigned to node 1620 and obtaining data records. Once no additional queue assignments are available, a task 1620 may be terminated. Completion of all queues results in the data file being assembled in shared cache 1635. The data file in shared cache 1635 may then be returned as a response to a request for the data file. Depending on the configuration, a pointer to the cache may alternatively be returned as a response to the request for the data file.

Figure 17:
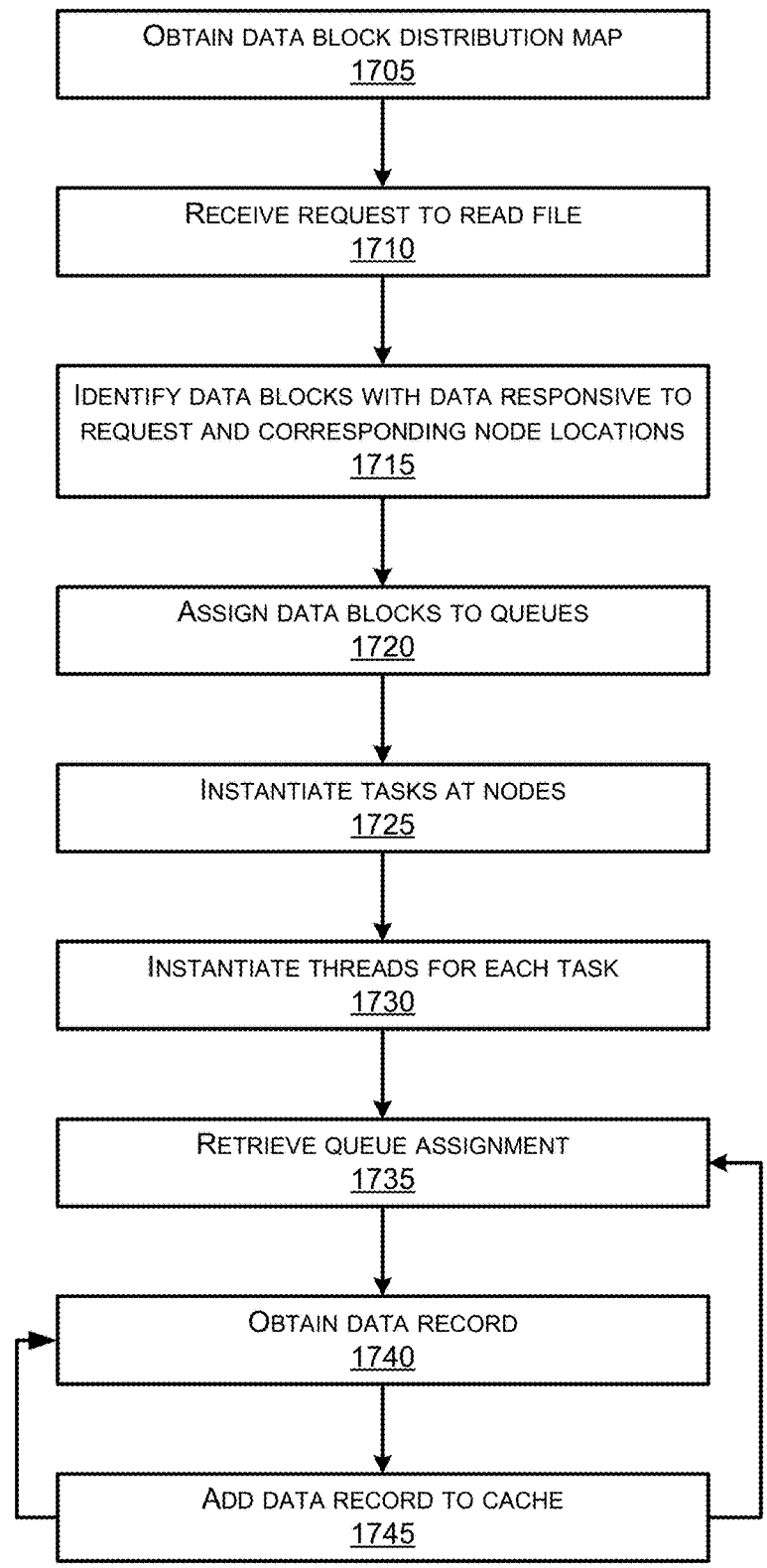
FIG. 17 provides an overview of a method for reading a data file from a distributed storage system, according to some embodiments of the present technology.

FIG. 17 provides an overview of a method 1700 for reading a data file from a distributed storage system. Method 1700 includes, at block 1705, obtaining a data block distribution map. As described above, a data block distribution map may correspond to a table or map of which nodes include which data blocks and/or which data blocks include which files. A data block distribution map may itself be stored on a distributed storage system and may, for example, be stored in memory associated with a controller or task master.

At block 1710 a request to read a data file is received. As an example, a distributed file system may correspond to a Hadoop Distributed File System. The request may be received, for example, by way of a network communication, such as received at a controller or task master associated with a distributed data storage system. The request may be associated with a particular client or data processing routine or operation. Depending on the configuration and process for which the data file is being used, the request for reading the data file may be preceded by or followed by a request for writing a new data file or overwriting the data file.

For generating a response to the request to read a data file, data blocks including data responsive to the request and corresponding node locations may be identified, at block 1715, such as by using the data block distribution map. As noted above, data blocks may be replicated on local storage of one or more nodes for redundancy purposes, so it is contemplated that each data block may have multiple corresponding nodes identified on the data block distribution map.

At block 1720, each data blocks is assigned to queues, such as queues associated with nodes locally storing the data block. Again, since data blocks may be replicated on local storage of one or more nodes for redundancy purposes, a single data block could have multiple queue assignments.

For purposes of reading the data block, the queue assignment may not be impacted by which node a data block is stored on, so long as the data block is stored on local storage of the node associated with the queue. In some embodiments, for example, queue assignments may be balanced across nodes as evenly as possible so that read performance may be maximized. As another example, in some embodiments, certain nodes may exhibit better read/data retrieval performance than other nodes and thus higher performing nodes may have a larger number of blocks assigned to the associated queue than lower performing nodes.

At block 1725, a plurality of tasks may be instantiated on each of the multiple nodes locally storing data responsive to the requests, such as tasks for adding data responsive to the request to read a data file to a shared cache or memory associated with the request or with a master task or controller. Each of the plurality of tasks on a particular node may be processed in parallel to expedite the file read process. As an example, a task may correspond to a MapReduce task within a particular distributed file storage implementation.

At block 1730, a plurality of threads for retrieving the data block and caching the data may be instantiated for each task. Each of the plurality of threads within a particular task may be processed in parallel to expedite the file read process. As noted above, the maximum number of tasks and threads may be configurable for different implementations. For an example including 2 tasks per node and 3 threads per task, this corresponds to a maximum of 6 threads operating on a particular node. Other examples, including more than 2 tasks per node and more than 3 threads per task are possible, such as any integer number of maximum tasks per node between 2 and 100 and any integer number of maximum threads per task between 2 and 100. More than 100 tasks per node and more than 100 threads per task are also possible, though hardware implementations may dictate useful practical maxima.

Each thread may retrieve a queue assignment, as indicated at block 1735, which may identify a particular data block that the thread is responsible for reading. Queue assignments may be retrieved in sequence by the different threads processing within or on a particular task or node from a queue associated with the particular node.

For processing the queue assignments, each thread may obtain a data record associated with the data block corresponding to a current queue assignment, as indicated at block 1740, and add the data record to a shared cache associated with the file request, as indicated at block 1745. Optionally, obtaining data records from local storage may correspond to instantiating an HCatalog reader object, calling the HCatalog reader object, and reading the data record from local storage using the HCatalog reader object. The processes of obtaining data records (block 1740) and adding data records to the cache (block 1745) may be repeated until all data records associated with a particular data block are retrieved.

Once the entire data block associated with a particular queue assignment is retrieved and added to the shared cache, a thread may obtain a next queue assignment and begin the process of obtaining data records for the next data block associated with the next queue assignment and adding the data records to the cache. The process may continue repeating until all data records for all data blocks are retrieved and written to the cache.

When no data block assignments remain in the queue upon completion of a particular queue assignment, the thread may be terminated. Following termination of all instantiated threads within a particular task, the task may be terminated. When all queue assignments for a particular node are retrieved and completed, the data blocks assigned to that node are completely written to the shared cache. Once all queues are exhausted, the data blocks comprising the file requested is completely written to the shared cache. The file then may be returned, for example, to a client or other requesting device.

Figure 18:
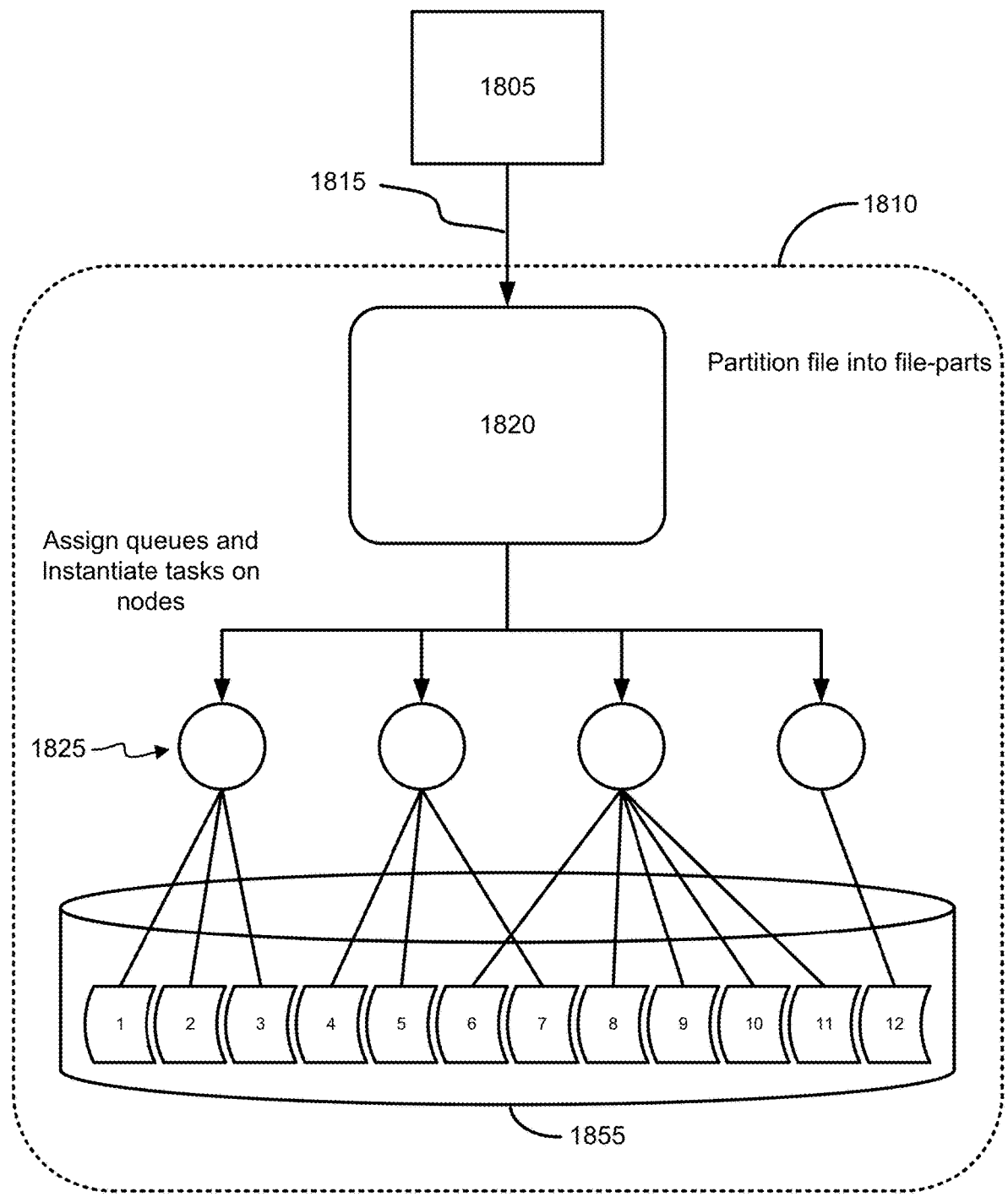
FIG. 18 provides a schematic illustration of a client writing a data file to a distributed storage system, according to some embodiments of the present technology.

FIG. 18 provides a schematic illustration of a client 1805 writing a file to a distributed storage system 1810. Client 1805 may communicate a request 1815 to write the file, which may be received at a controller 1820 of the distributed storage system 1810. It will be appreciated that request 1815 may be communicated by way of one or more data or network communication systems. Controller 1820 may correspond to a server or node of or a process or subroutine operating on distributed storage system 1810. The file request may optionally include a copy of the file or may provide a pointer to a buffer or other memory location at which the file to be written to the distributed storage system is stored.

Controller 1820 may partition the file into a plurality of file-parts, such as file-parts which have a size corresponding to a data block size on the distributed storage system 1810. It will be appreciated that each file part may correspond to a portion of the file requested to be written in request 1815. Assignments of each file-part may be then added to a queue of write jobs. The queue of file-part assignments may or may not include redundancies for writing a particular file-part using multiple nodes 1825 of distributed storage system. Tasks may be instantiated on each of the nodes 1825 to complete the process of writing all the file-parts to the distributed storage 1855. Once all the file-parts are written by nodes 1825, a completion notice may be communicated to client 1805.

It will be appreciated that, although not so illustrated in FIG. 18, one or more data blocks may be replicated on multiple nodes in order to provide redundancy to the data blocks. To achieve this replication, embodiments optionally include queueing a particular file-part two or more times such that two or more nodes receive queue assignments associated with the particular file-part to replicate the file-part in data blocks on multiple nodes.

Figure 19:
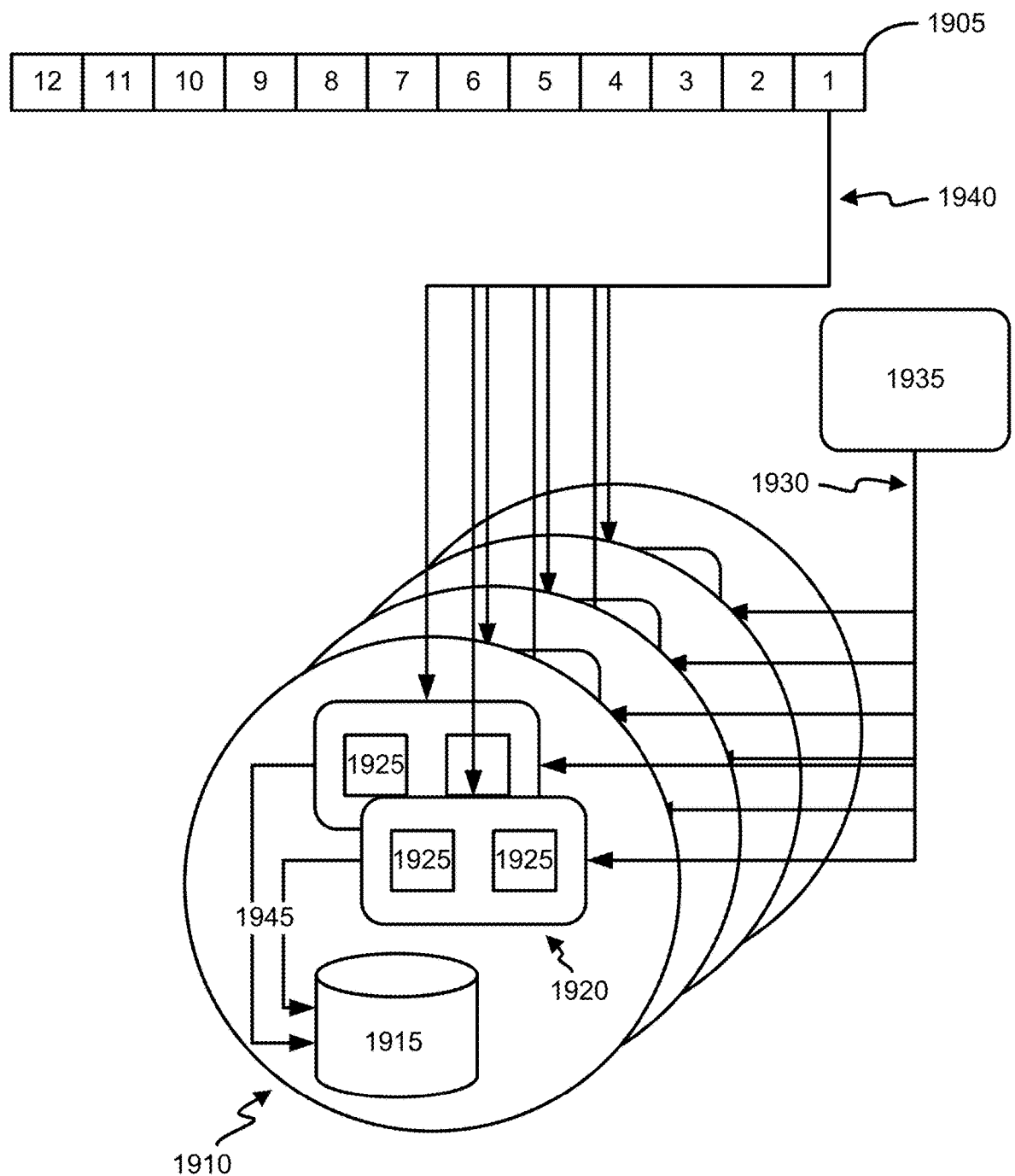
FIG. 19 provides a schematic illustration of a technique for writing a data file to a distributed storage system, according to some embodiments of the present technology.

FIG. 19 provides a schematic overview of writing a data file to a distributed storage system. In FIG. 19, data-file part assignments for the data file are added to a queue 1905, as described above. Multiple tasks 1920 may be instantiated on each node 1910, and each task may instantiate a plurality of threads 1925 for performing the write processes needed to complete writing the file-parts of a file to local storage 1915 across nodes 1910. It will be appreciated that the number of tasks 1920 and the number of threads 1925 may be a configurable option in a distributed storage implementation, but use of multiple tasks 1920 and multiple threads 1925, at least in part, may provide optimizations and enhancements over other distributed storage implementations, as noted above. It will further be appreciated that each task 1920 may process or operate in parallel on each node 1910. Similarly, each thread 1925 may process or operate in parallel within each task 1920.

Processing of instantiated tasks 1920 and threads 1925 may result in retrieving (1940) file-part assignments from queue 1905, retrieving (1930) data records associated with a particular file-part assignment from buffer 1935, which may correspond to a memory, temporary storage element, or other transitory or non-transitory storage location within a distributed storage system, and writing (1945) the data records to local storage 1915. A queue assignment may correspond, for example, to a particular file-part that is to be written to local storage 1915 on node 1910 to fulfill the request. Each thread 1920 may obtain (1930) a data record from buffer 1635 for the data block associated with a current assignment and write (1945) the data record to the local storage 1915 of the node and repeat obtaining data records until all data records for a particular file-part are obtained and written to local storage 1915. Once all data records associated with a particular file-part are obtained and written to local storage 1915, thread 1925 may repeat retrieving a queue assignment (if any remain) from the queue 1905 and begin obtaining data records. Once no additional queue assignments are available, a task 1920 may be terminated. Completion of all queues results in the data file being written to the local storages 1915 across nodes 1910. A response to a request for writing data file may optionally be returned to a client indicating successful writing of the data file to the distributed storage.

Figure 20:
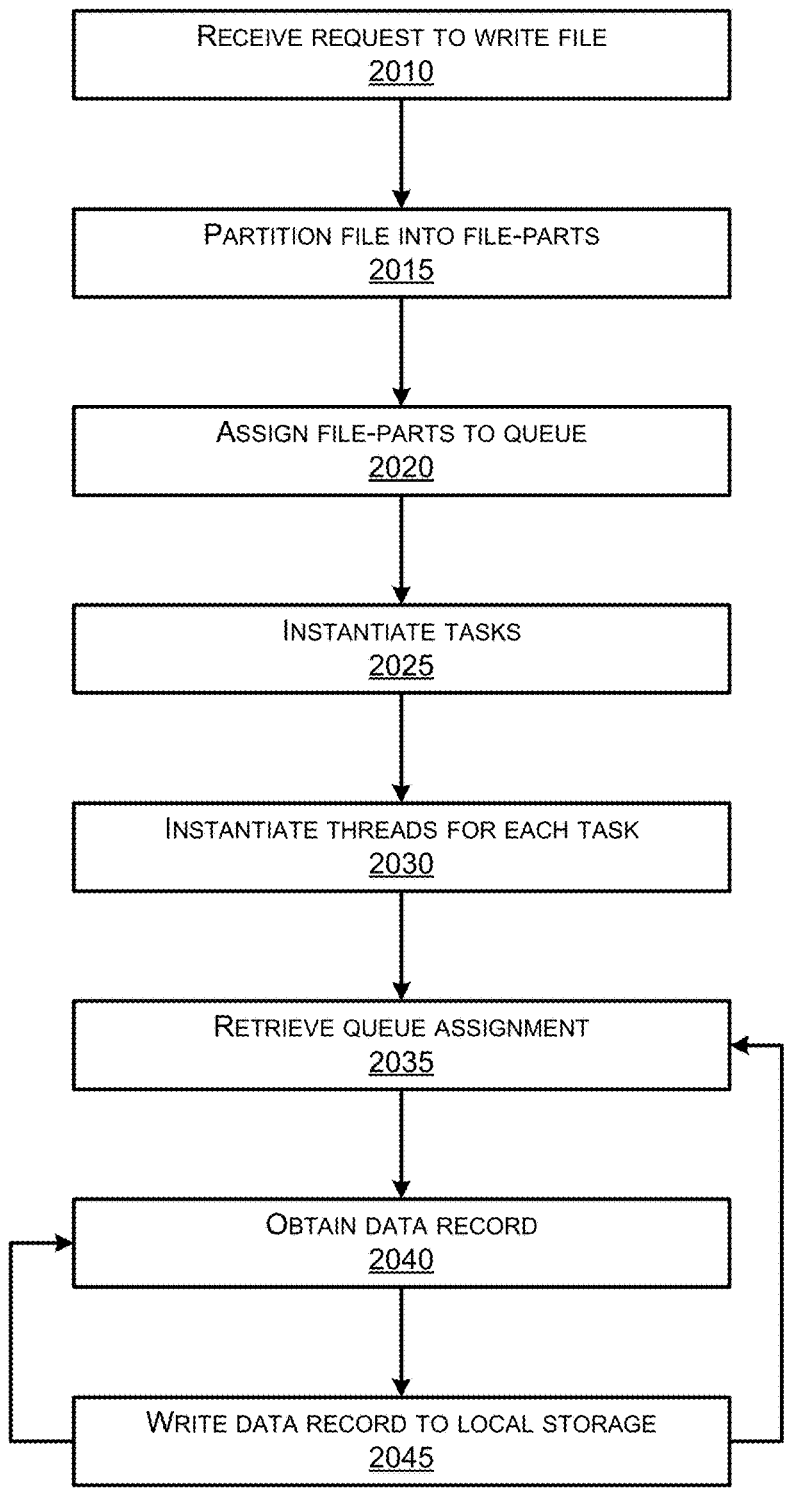
FIG. 20 provides an overview of a method for writing a data file to a distributed storage system, according to some embodiments of the present technology.

FIG. 20 provides an overview of a method 2000 for writing a data file to a distributed storage system. Method 2000 includes, at block 2010, receiving a request to write a data file to a distributed file system. As an example, a distributed file system may correspond to a Hadoop Distributed File System. The request may be received, for example, by way of a network communication, such as received at a controller or task master associated with a distributed data storage system. The request may be associated with a particular client or data processing routine or operation. Depending on the configuration and process for which the data file is being used, the request for writing the data file may be preceded by or followed by a request for reading another data file may correspond. Alternatively, the request to write the data file may correspond to a request to overwrite the data file, in which case a data block distribution map may be obtained and used to identify particular nodes associated with each data block.

For performing the request to write a data file to distributed storage, the data file may be partitioned into a plurality of file-parts, at block 2015. As noted above, file-parts may correspond to individual portions of the data file to be written to distributed storage such, and each file-part may correspond in size to a data block size of the distributed storage system.

At block 2020, the file-parts are assigned to a queue. It will be appreciated that the file-parts may be replicated on local storage of one or more nodes for redundancy purposes, so it is contemplated that each file-part may be queued multiple times or each file-part may be permitted to be retrieved from the queue by multiple nodes to enable the file-part to be written to local storage on multiple nodes. If the file corresponds to a file to be overwritten, individual queues may be assigned to each node storing data blocks corresponding to the different file-parts. In some embodiments, for example, queue assignments may be balanced across nodes as evenly as possible so that write performance may be maximized. As another example, in some embodiments, certain nodes may exhibit better write/data storage performance than other nodes and thus higher performing nodes may retrieve a larger number of queue assignments than lower performing nodes.

At block 2025, a plurality of tasks may be instantiated on each of multiple nodes to which the file-parts are to be written to local storage. Each of the plurality of tasks on a particular node may be processed in parallel to expedite the file read process. As an example, a task may correspond to a MapReduce task within a particular distributed file storage implementation.

At block 1930, a plurality of threads for writing the file-part to local storage may be instantiated for each task. Each of the plurality of threads within a particular task may be processed in parallel to expedite the file write process. As noted above, the maximum number of tasks and threads may be configurable for different implementations. For an example including 2 tasks per node and 3 threads per task, this corresponds to a maximum of 6 threads operating on a particular node. Other examples, including more than 2 tasks per node and more than 3 threads per task are possible, such as any integer number of maximum tasks per node between 2 and 100 and any integer number of maximum threads per task between 2 and 100. More than 100 tasks per node and more than 100 threads per task are also possible, though hardware implementations may dictate useful practical maxima.

Each thread may retrieve a queue assignment, as indicated at block 2035, which may identify a particular file-part the thread is responsible for writing to local storage. Queue assignments may optionally be retrieved in sequence by all of the different threads processing across all nodes to ensure that the file-parts are distributed amongst the nodes. Again, data redundancies are possible, and a single file-part may be obtained from the queue by multiple nodes in embodiments where this is desired, so that the file-part may be replicated on multiple nodes.

For processing the queue assignments, each thread may obtain a data record associated with the file-part corresponding to a current queue assignment, as indicated at block 2040, such as from a buffer or other shared memory location, and the data record may be written to local storage of the node on which the thread and/or task is operating, as indicated at block 2045. Optionally, writing data records to local storage may correspond to instantiating an HCatalog writer object, calling the HCatalog writer object, and writing the data record to local storage using the HCatalog writer object. The processes of obtaining data records (block 2040) and adding writing data records to the local storage (block 2045) may be repeated until all data records associated with a particular file-part are written.

Once all data records for a file-part associated with a particular queue assignment are retrieved and written to local storage, a thread may obtain a next queue assignment and begin the process of obtaining data records for the next file-part associated with the next queue assignment and writing the data records to local storage. The process may continue repeating until all data records for all file-parts are retrieved and written to local storage.

When no file-part assignments remain in the queue upon completion of a particular queue assignment, the thread may be terminated. Following termination of all instantiated threads within a particular task, the task may be terminated. When all queue assignments are retrieved and completed, the file is written to the distributed storage system. An indication of completion may be returned, for example, to a client or other requesting device.

Optionally, method 2000 further includes updating a data block distribution map to identify newly written data blocks corresponding to the different file-parts and the nodes associated with the data blocks.

It will be appreciated that, although the process of reading a data file from a distributed storage system has been described with reference to data blocks, implementations where data splits are used instead of data blocks are contemplated and it will be appreciated that the foregoing description applies to both data block implementations and data split implementations.

It will be appreciated that, although the process of reading a data file from a distributed storage system has been described with reference to data blocks, implementations where data splits are used instead of data blocks are contemplated and it will be appreciated that the foregoing description applies to both data block implementations and data split implementations.

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A system for reading files from a distributed file system, comprising:
   one or more processors; and
   a non-transitory computer readable storage medium in data communication with the one or more processors, wherein the non-transitory computer readable storage medium includes instructions that, when executed by the one or more processors, cause the one or more processors to perform operations including:
   obtaining a data block distribution map for a distributed file system, wherein the distributed file system corresponds to a plurality of data blocks distributed across a plurality of nodes, wherein the data block distribution map identifies which data blocks are locally stored by each node, and wherein data blocks include multiple data records;
   receiving a request to read a file from the distributed file system;
   identifying, using the data block distribution map, multiple data blocks including data responsive to the request and nodes locally storing the multiple data blocks, wherein each of the multiple data blocks corresponds to a portion of the file;
   assigning each of the multiple data blocks into block queues, wherein each block queue includes a separate subset of data blocks from the multiple data blocks, wherein each block queue is individually associated with a respective read task, and wherein each separate subset of data blocks assigned to a corresponding block queue includes data blocks locally stored by a node that the respective read task is operating on;
   instantiating, at each of multiple nodes locally storing data responsive to the request, a plurality of read tasks for reading the file from the distributed file system by adding data responsive to the request to an output file associated with the request, wherein each read task corresponds to an individual process operating on a respective node for reading data blocks locally stored on the respective node using pluralities of threads; and
   processing, in parallel, each plurality of read tasks instantiated at the nodes locally storing data responsive to the request, wherein processing each task includes:
   instantiating, for the read task, a plurality of threads for reading data responsive to the request; and
   processing each of the plurality of threads in parallel, wherein processing each thread includes repeating, without terminating the thread until all block assignments from the block queue associated with the read task are retrieved:
   retrieving a next block assignment from the block queue associated with the read task of the respective node on which the thread is processing;
   obtaining a next data record from local storage of the node on which the thread is processing, wherein the next data record is associated with a next data block of the next block assignment from the block queue; and
   adding the next data record to the output file associated with the request.

2. The system of claim 1, wherein the operations further include:
- returning the file as a response to the request, wherein the response corresponds to data records added to the output file by all the threads.

3. The system of claim 1, wherein processing each thread includes repeating, until all data records associated with the data block of the block assignment are added to the output file:
- obtaining a next data record from local storage of the particular node on which the thread is processing, wherein the next data record is associated with the data block of the block assignment; and
- adding the next data record to the output file associated with the request.

4. The system of claim 1, wherein processing each thread includes terminating the thread when all block assignments from the block queue associated with the read task are retrieved.

5. The system of claim 1, wherein a maximum number of read tasks instantiated at the nodes locally storing data responsive to the request is configurable.

6. The system of claim 1, wherein a maximum number of threads instantiated by each read task is configurable.

7. The system of claim 1, wherein the distributed file system corresponds to a Hadoop Distributed File System.

8. The system of claim 1, wherein each read task corresponds to a custom MapReduce task.

9. The system of claim 1, wherein obtaining the data record from local storage of the particular node on which the thread is processing includes instantiating an HCatalog reader object, calling the HCatalog reader object, and reading the data record from local storage using the HCatalog reader object.

10. The system of claim 1, wherein the data block distribution map corresponds to a split distribution map, and wherein each data block is associated with a split.

11. A computer-program product for reading files from a distributed file system, the computer-program product tangibly embodied in a non-transitory computer readable storage medium comprising instructions configured to, when executed by one or more processors, cause the one or more processors to perform operations including:
- obtaining a data block distribution map for a distributed file system, wherein the distributed file system corresponds to a plurality of data blocks distributed across a plurality of nodes, wherein the data block distribution map identifies which data blocks are locally stored by each node, and wherein data blocks include multiple data records;
- receiving a request to read a file from the distributed file system;
- identifying, using the data block distribution map, multiple data blocks including data responsive to the request and nodes locally storing the multiple data blocks, wherein each of the multiple data blocks corresponds to a portion of the file;
- assigning each of the multiple data blocks into block queues, wherein each block queue includes a separate subset of data blocks from the multiple data blocks, wherein each block queue is individually associated with a respective read task of, and wherein each separate subset of data blocks assigned to a corresponding block queue includes data blocks locally stored by a node that the respective read task is operating on;
- instantiating, at each of multiple nodes locally storing data responsive to the request, a plurality of read tasks for reading the file from the distributed file system by adding data responsive to the request to an output file associated with the request, wherein each read task corresponds to an individual process operating on a respective node for reading data blocks locally stored on the respective node using pluralities of threads; and
- processing, in parallel, each plurality of read tasks instantiated at the nodes locally storing data responsive to the request, wherein processing each read task includes:
  - instantiating, for the read task, a plurality of threads for reading data responsive to the request; and
  - processing each of the plurality of threads in parallel, wherein processing each thread includes repeating, without terminating the thread until all block assignments from the block queue associated with the read task are retrieved:
    - retrieving a next block assignment from the block queue associated with the read task of the respective node on which the thread is processing;
    - obtaining a next data record from local storage of the node on which the thread is processing, wherein the next data record is associated with a next data block of the next block assignment from the block queue; and
    - adding the next data record to the output file associated with the request.

12. The computer-program product of claim 11, wherein the operations further include:
- returning the file as a response to the request, wherein the response corresponds to data records added to the output file by all the threads.

13. The computer-program product of claim 11, wherein processing each thread includes repeating, until all data records associated with the data block of the block assignment are added to the output file:
- obtaining a next data record from local storage of the particular node on which the thread is processing, wherein the next data record is associated with the data block of the block assignment; and
- adding the next data record to the output file associated with the request.

14. The computer-program product of claim 11, wherein processing each thread includes terminating the thread when all block assignments from the block queue associated with the respective read task are retrieved.

15. The computer-program product of claim 11, wherein a maximum number of read tasks instantiated at the nodes locally storing data responsive to the request is configurable.

16. The computer-program product of claim 11, wherein a maximum number of threads instantiated by each read task is configurable.

17. The computer-program product of claim 11, wherein the distributed file system corresponds to a Hadoop Distributed File System.

18. The computer-program product of claim 11, wherein each read task corresponds to a custom MapReduce task.

19. The computer-program product of claim 11, wherein obtaining the data record from local storage of the particular node on which the thread is processing includes instantiating an HCatalog reader object, calling the HCatalog reader object, and reading the data record from local storage using the HCatalog reader object.

20. The computer-program product of claim 11, wherein the data block distribution map corresponds to a split distribution map, and wherein each data block is associated with a split.

21. A computer implemented method for reading files from a distributed file system, comprising:
- obtaining a data block distribution map for a distributed file system, wherein the distributed file system corresponds to a plurality of data blocks distributed across a plurality of nodes, wherein the data block distribution map identifies which data blocks are locally stored by each node, and wherein data blocks include multiple data records;
- receiving a request to read a file from the distributed file system;
- identifying, using the data block distribution map, multiple data blocks including data responsive to the request and nodes locally storing the multiple data blocks, wherein each of the multiple data blocks corresponds to a portion of the file;
- assigning each of the multiple data blocks into block queues, wherein each block queue includes a separate subset of data blocks from the multiple data blocks, wherein each block queue is individually associated with a respective read task, and wherein each separate subset of data blocks assigned to a corresponding block queue includes data blocks locally stored by a node that the respective read task is operating on;
- instantiating, at each of multiple nodes locally storing data responsive to the request, a plurality of read tasks for reading the file from the distributed file system by adding data responsive to the request to an output file associated with the request, wherein each read task corresponds to an individual process operating on a respective node for reading data blocks locally stored on the respective node using pluralities of threads; and
- processing, in parallel, each plurality of read tasks instantiated at the nodes locally storing data responsive to the request, wherein processing each read task includes:
  - instantiating a plurality of threads for reading data responsive to the request; and
  - processing each of the plurality of threads in parallel, wherein processing each thread includes repeating, without terminating the thread until all block assignments from the block queue associated with the read task are retrieved:
    - retrieving a next block assignment from the block queue associated with the read task of the respective node on which the thread is processing;
    - obtaining a next data record from local storage of the node on which the thread is processing, wherein the next data record is associated with a next data block of the next block assignment from the block queue; and
    - adding the next data record to the output file associated with the request.

22. The method of claim 21, further comprising:
returning the file as a response to the request, wherein the response corresponds to data records added to the output file by all the threads.

23. The method of claim 21, wherein processing each thread includes repeating, until all data records associated with the data block of the block assignment are added to the output file:
- obtaining a next data record from local storage of the particular node on which the thread is processing, wherein the next data record is associated with the data block of the block assignment; and
- adding the next data record to the output file associated with the request.

24. The method of claim 21, wherein processing each thread includes terminating the thread when all block assignments from the block queue associated with the respective read task are retrieved.

25. The method of claim 21, wherein a maximum number of read tasks instantiated at the nodes locally storing data responsive to the request is configurable.

26. The method of claim 21, wherein a maximum number of threads instantiated by each read task is configurable.

27. The method of claim 21, wherein the distributed file system corresponds to a Hadoop Distributed File System.

28. The method of claim 21, wherein each read task corresponds to a custom MapReduce task.

29. The method of claim 21, wherein obtaining the data record from local storage of the particular node on which the thread is processing includes instantiating an HCatalog reader object, calling the HCatalog reader object, and reading the data record from local storage using the HCatalog reader object.

30. The method of claim 21, wherein the data block distribution map corresponds to a split distribution map, and wherein each data block is associated with a split.

* * * * *